United States Patent
Hagiwara

(10) Patent No.: US 8,830,597 B2
(45) Date of Patent: Sep. 9, 2014

(54) ZOOM LENS AND IMAGE PICKUP APPARATUS INCLUDING THE SAME

(71) Applicant: Canon Kabushiki Kaisha, Tokyo (JP)

(72) Inventor: Yasuaki Hagiwara, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/834,817

(22) Filed: Mar. 15, 2013

(65) Prior Publication Data

US 2013/0250435 A1    Sep. 26, 2013

(30) Foreign Application Priority Data

Mar. 21, 2012    (JP) ................................ 2012-063356

(51) Int. Cl.
*G02B 9/60* (2006.01)
*G02B 15/173* (2006.01)
*G02B 15/14* (2006.01)

(52) U.S. Cl.
CPC .............. *G02B 15/14* (2013.01); *G02B 15/173* (2013.01)
USPC .......................................... 359/766; 359/763

(58) Field of Classification Search
CPC ........ G02B 17/00; G02B 15/173; G02B 5/12; G02B 9/60; G02B 15/16
USPC ......... 359/555, 557, 683, 714, 746, 753, 763, 359/766, 773
See application file for complete search history.

(56) References Cited

U.S. PATENT DOCUMENTS

| | | | | |
|---|---|---|---|---|
| 5,585,969 A | * | 12/1996 | Endo | 359/683 |
| 5,978,150 A | * | 11/1999 | Hamanishi et al. | 359/683 |
| 2005/0157403 A1 | * | 7/2005 | Sato | 359/687 |
| 2010/0214658 A1 | * | 8/2010 | Ito | 359/557 |
| 2011/0122506 A1 | * | 5/2011 | Ito | 359/683 |
| 2011/0194015 A1 | | 8/2011 | Kanetaka | |
| 2012/0105708 A1 | * | 5/2012 | Hagiwara | 348/345 |
| 2012/0262608 A1 | * | 10/2012 | Nakamura et al. | 348/240.3 |
| 2012/0293872 A1 | * | 11/2012 | Katayose et al. | 359/684 |

FOREIGN PATENT DOCUMENTS

JP    2000180722 A1    6/2000

* cited by examiner

*Primary Examiner* — Thomas K Pham
*Assistant Examiner* — Collin X Beatty
(74) *Attorney, Agent, or Firm* — Canon USA, Inc. IP Division

(57) ABSTRACT

A zoom lens includes, from an object side to an image side, a first lens unit having a positive refractive power, a second lens unit having a negative refractive power, an aperture stop, a third lens unit having a positive refractive power, a fourth lens unit having a negative refractive power, and a fifth lens unit having a positive refractive power. During zooming, the first lens unit and the aperture stop do not move and the second, third, and fourth lens units move along different loci. Lateral magnifications of the second lens unit at a wide angle end and at a telephoto end and lateral magnifications of the third lens unit at the wide angle end and at the telephoto end are each appropriately set based on predetermined mathematical conditions.

7 Claims, 22 Drawing Sheets

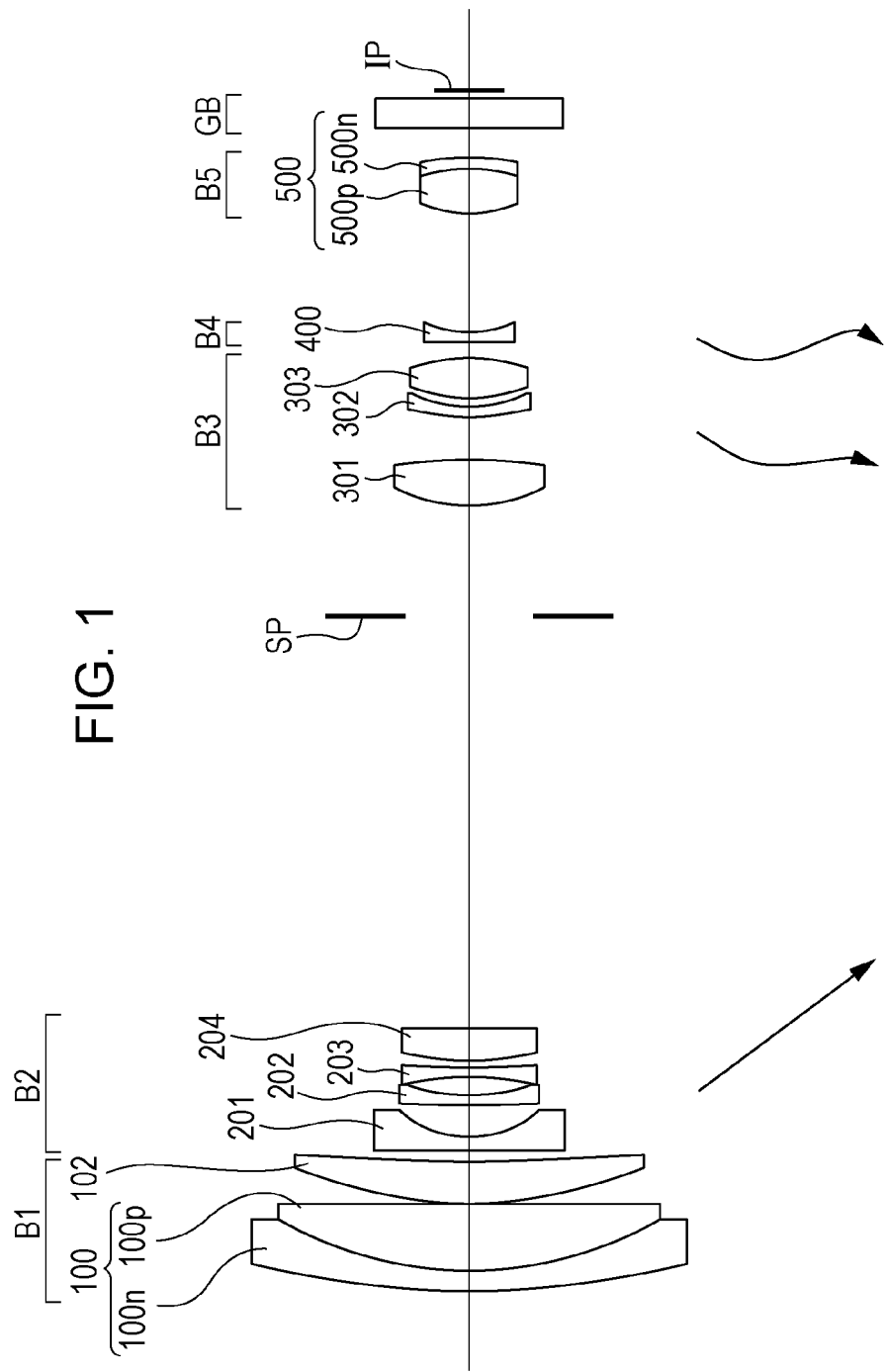

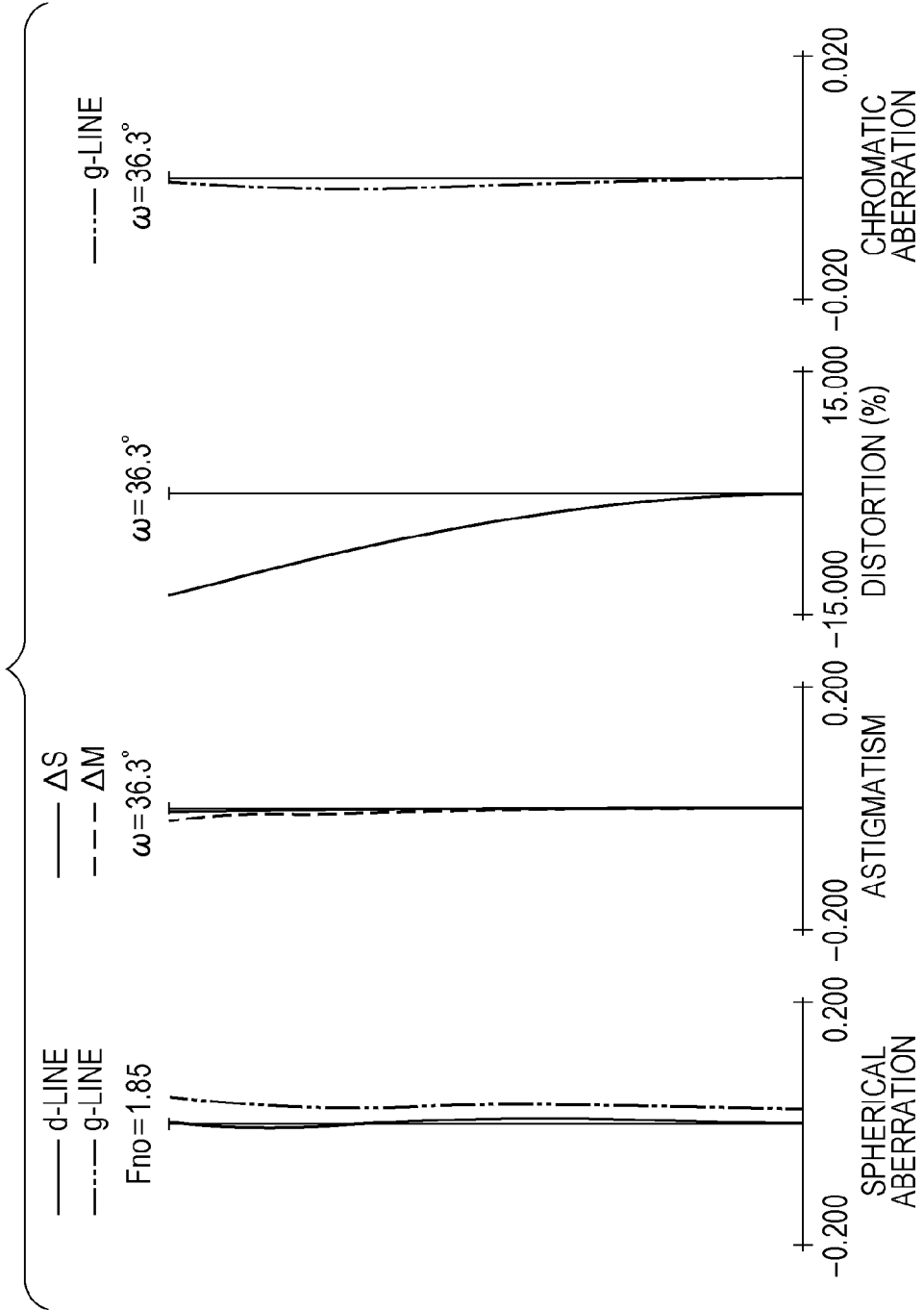

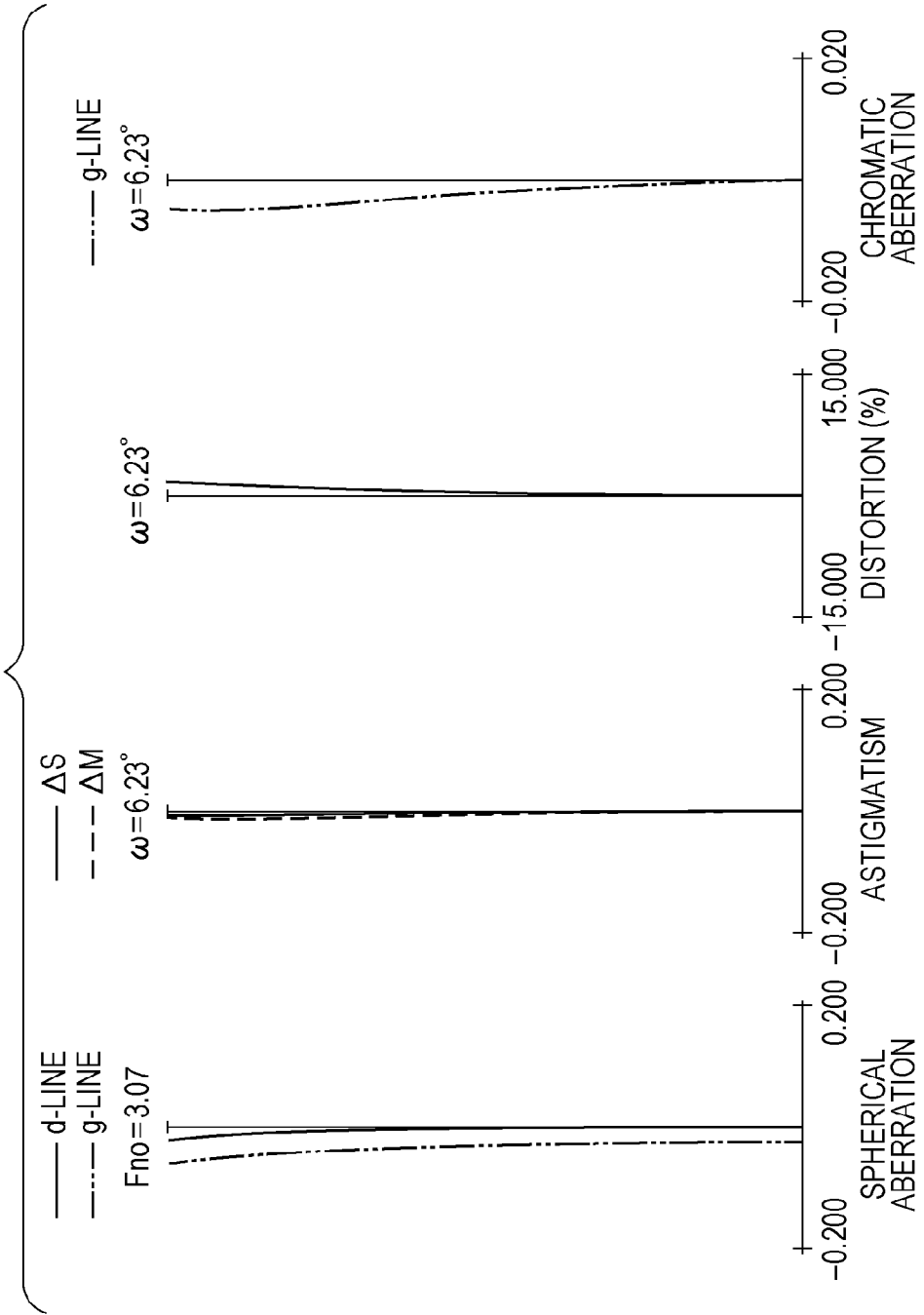

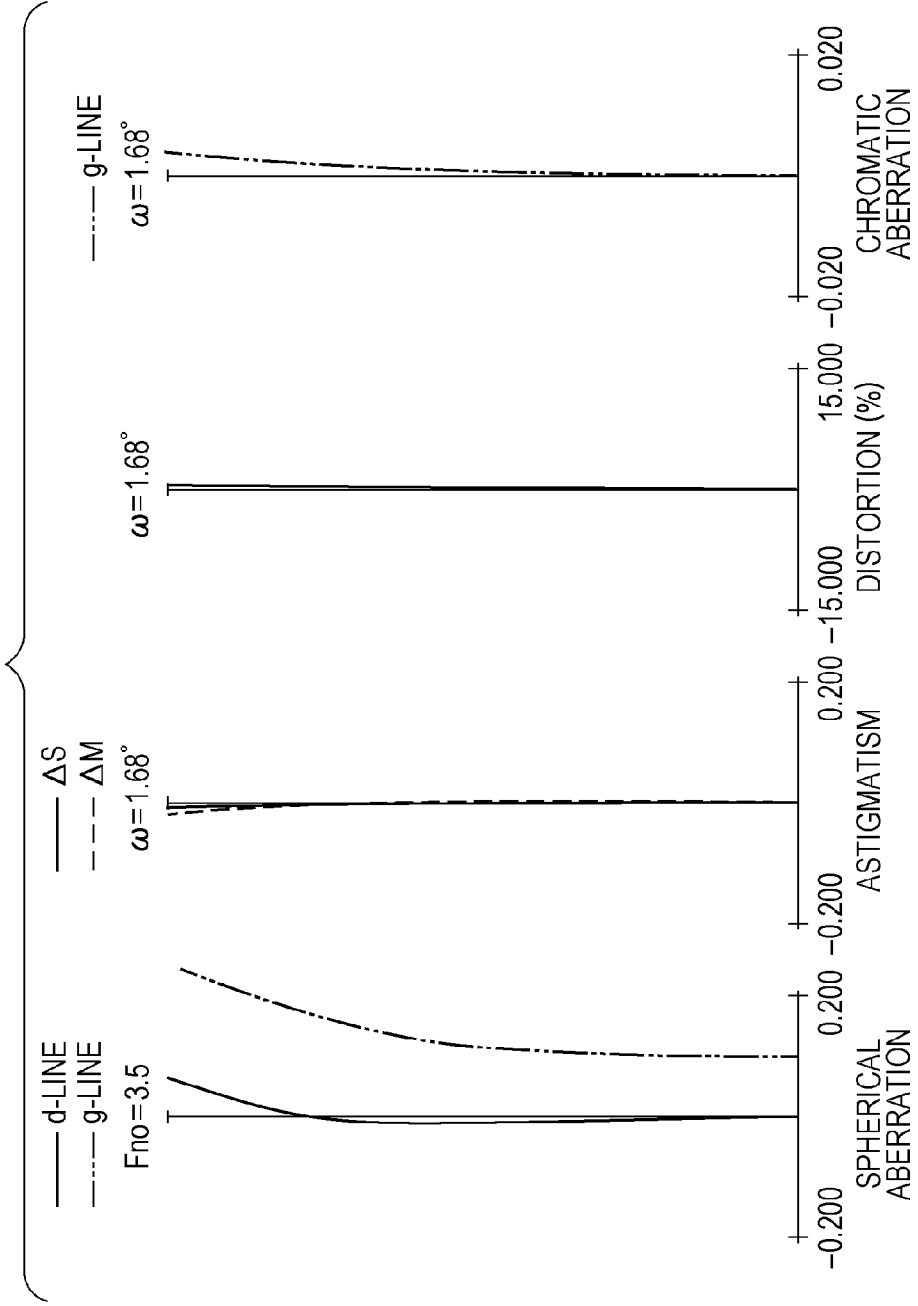

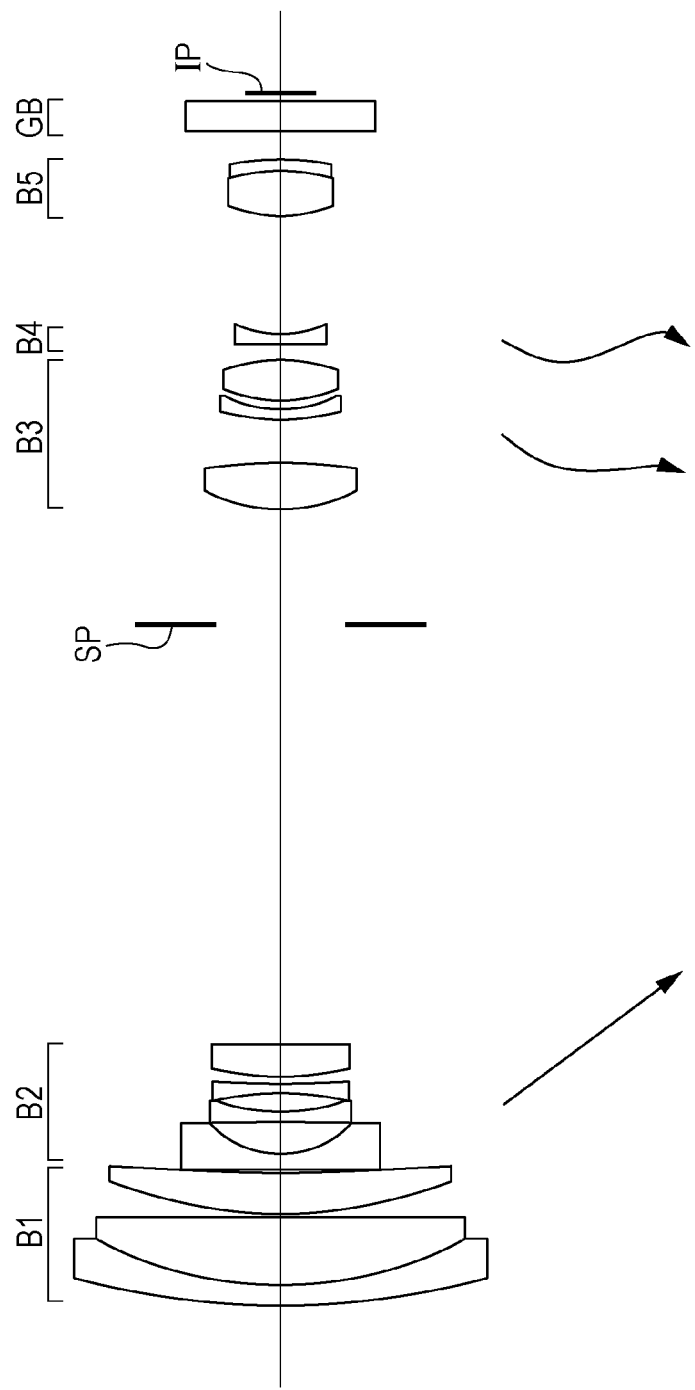

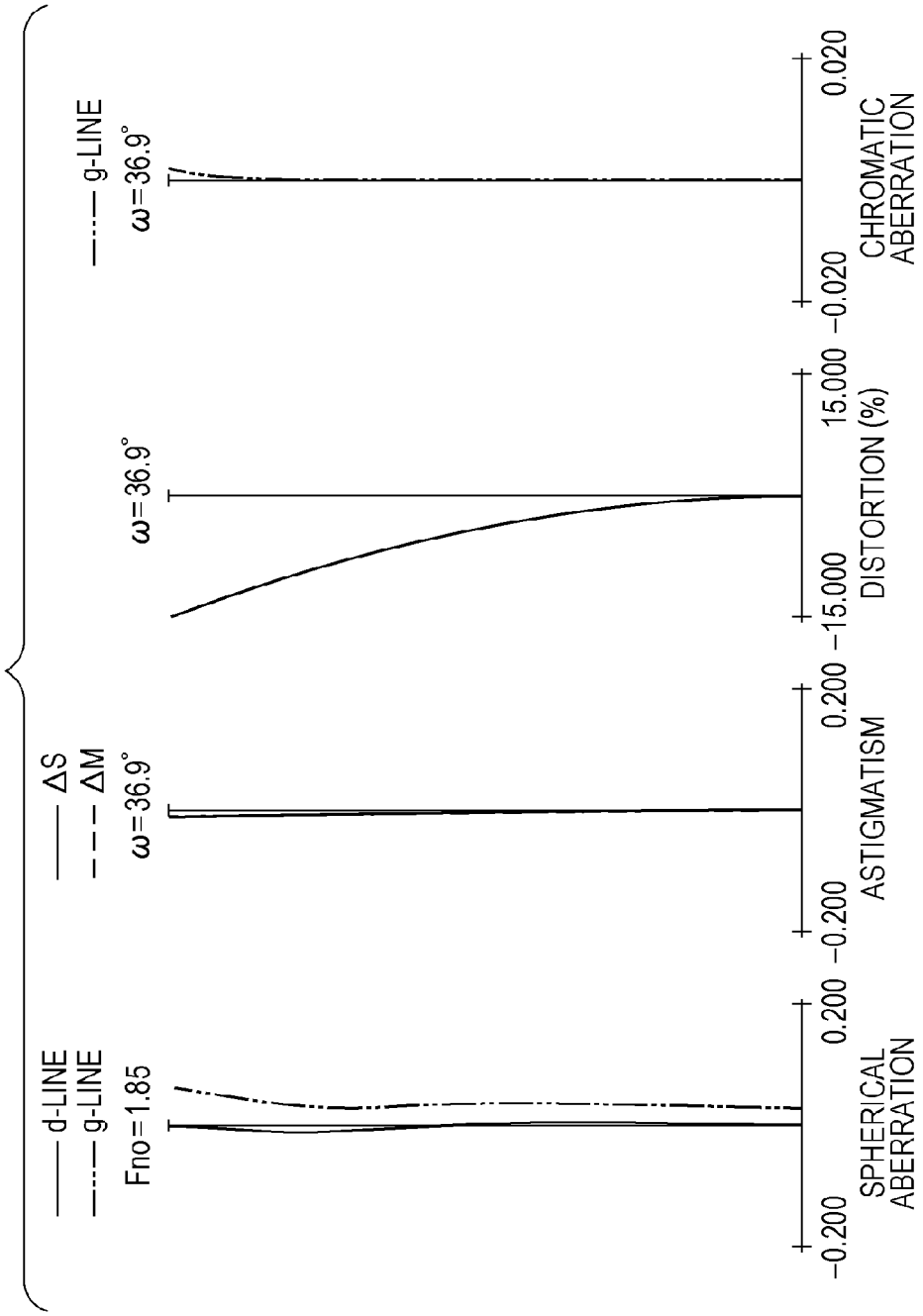

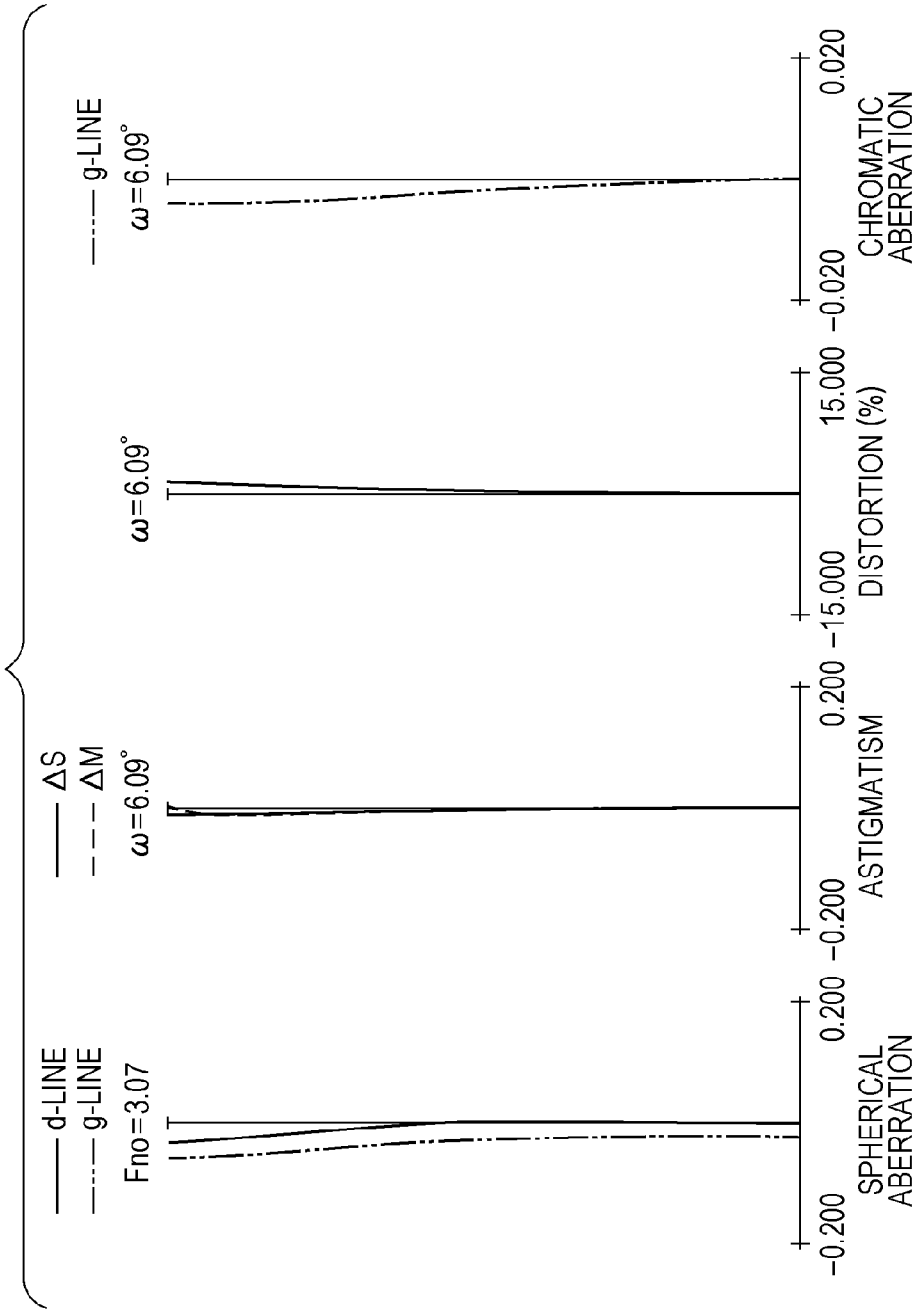

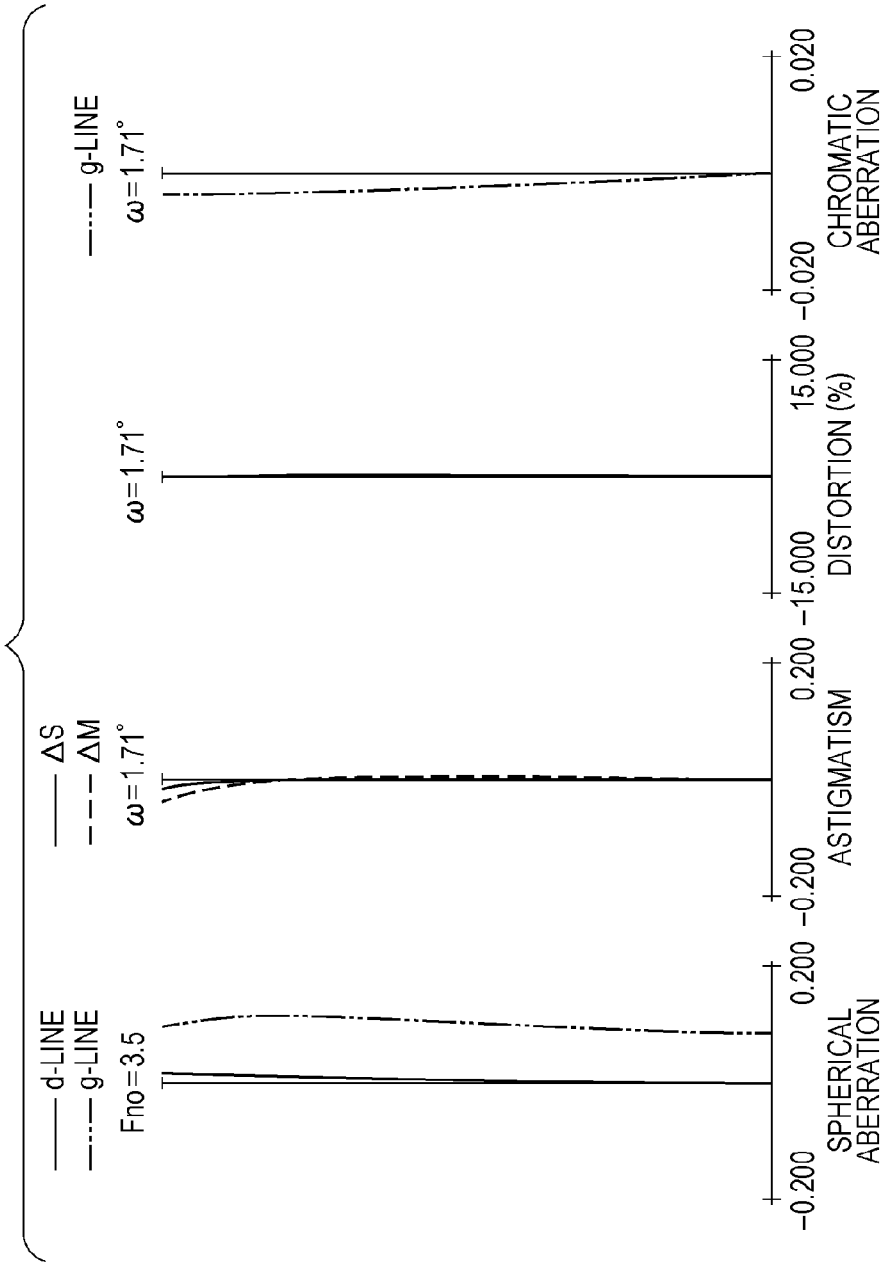

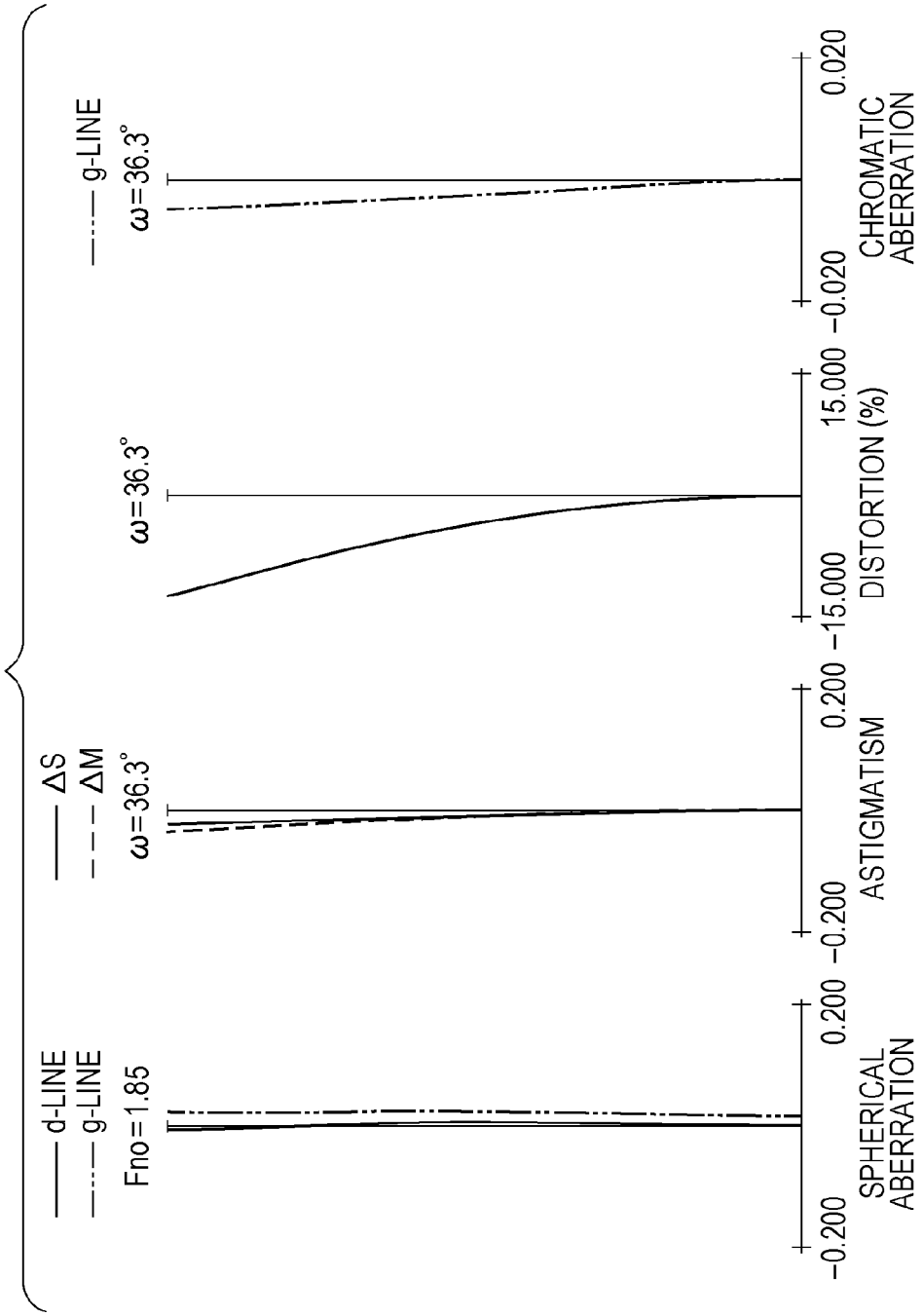

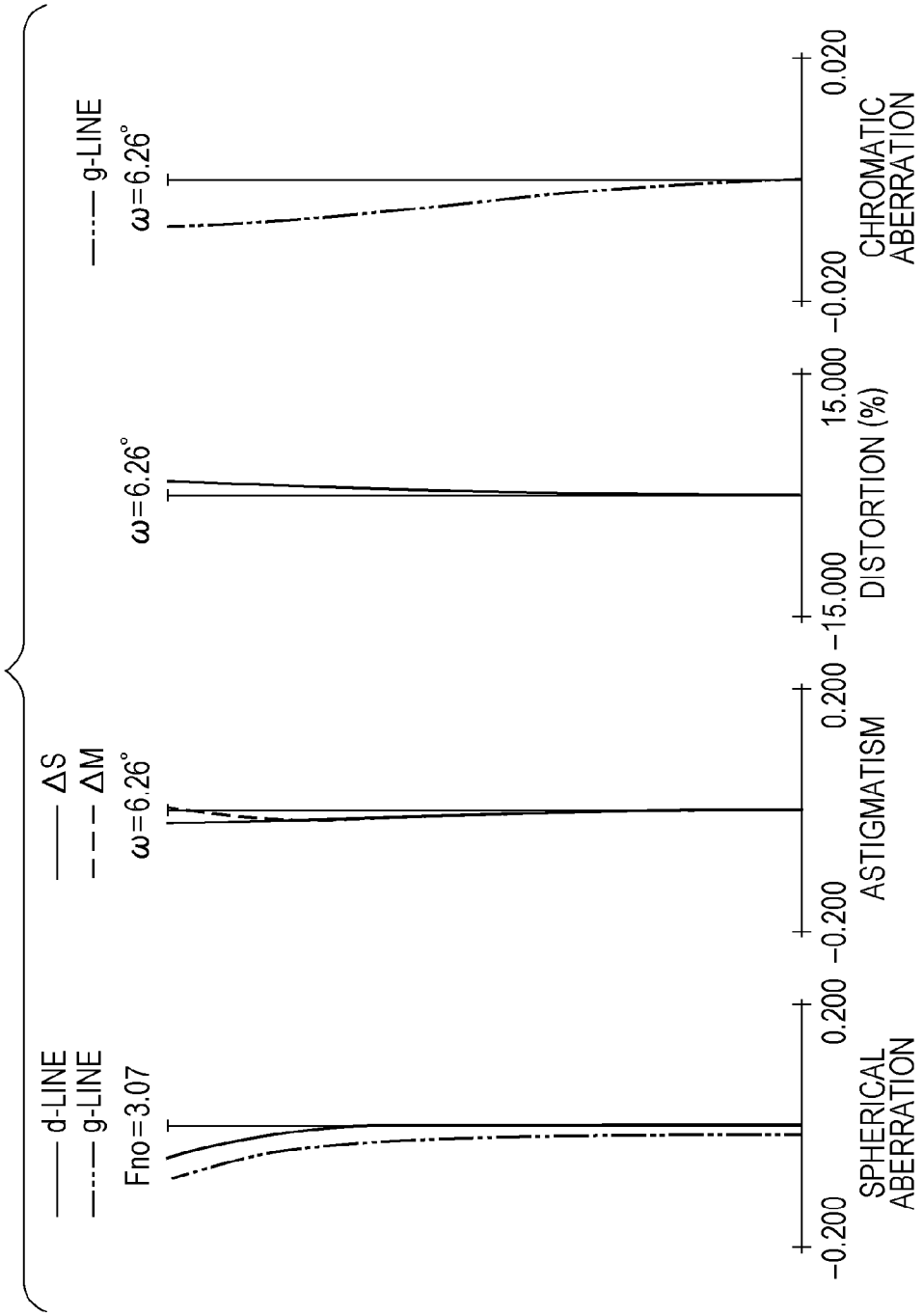

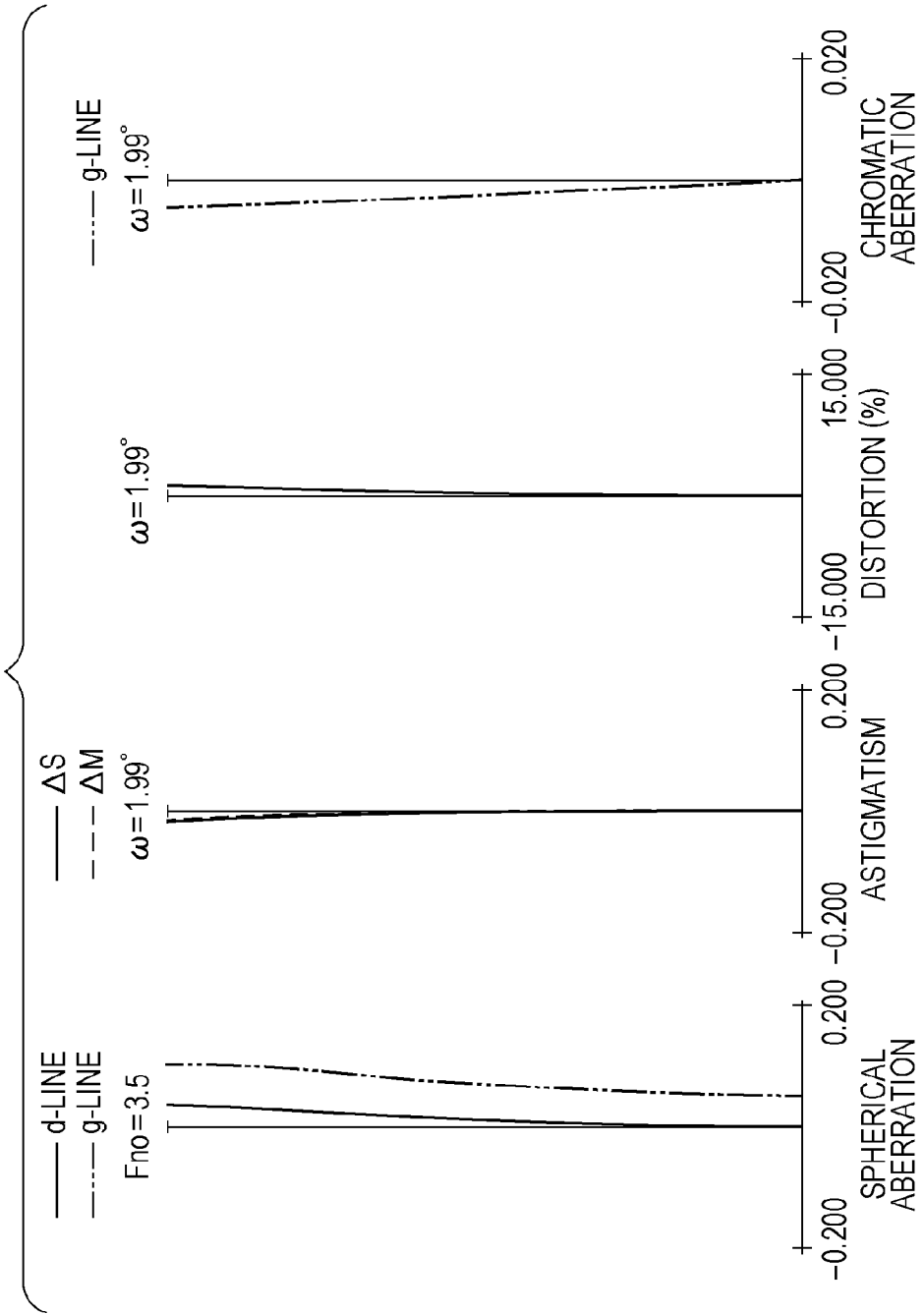

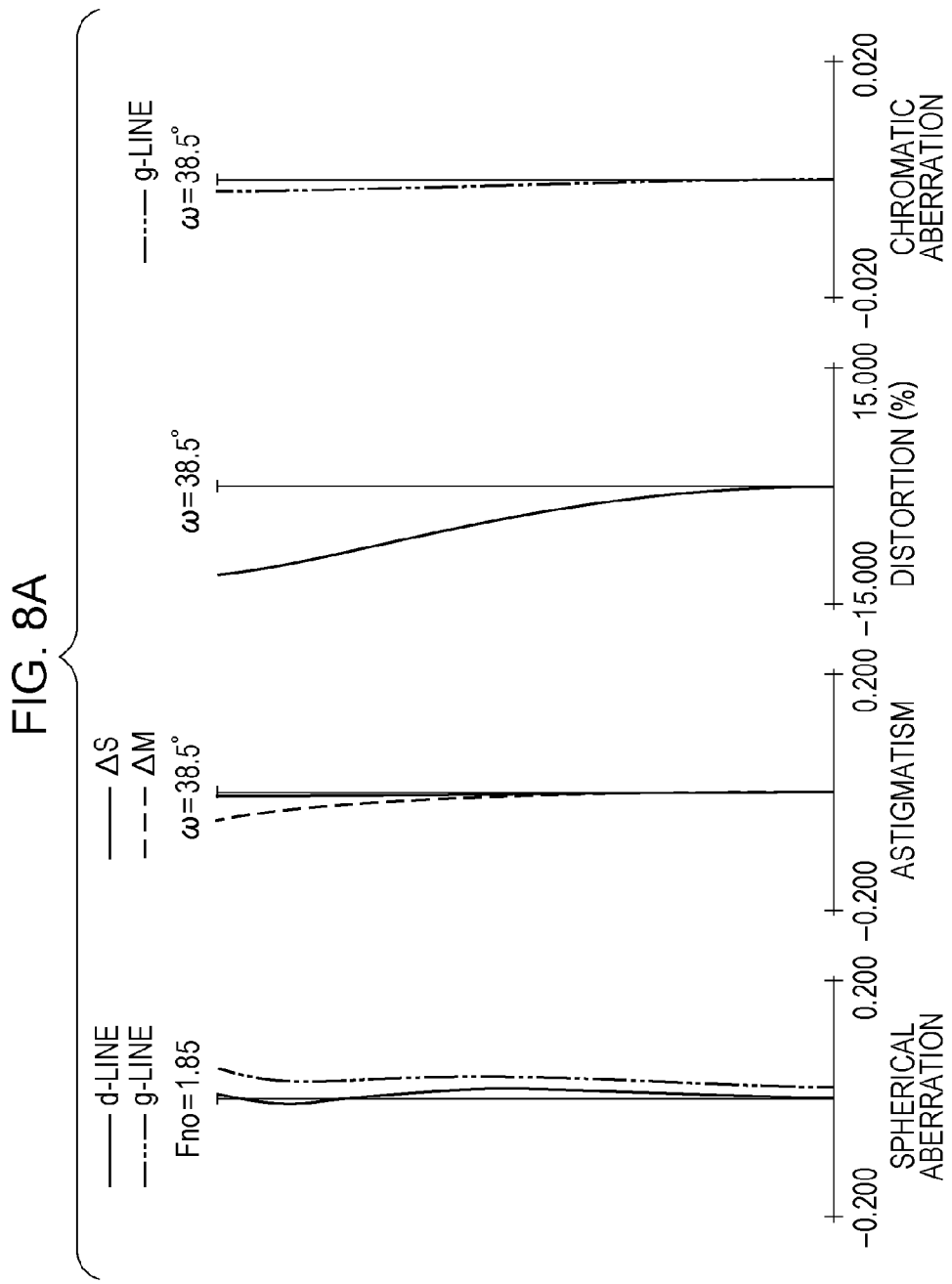

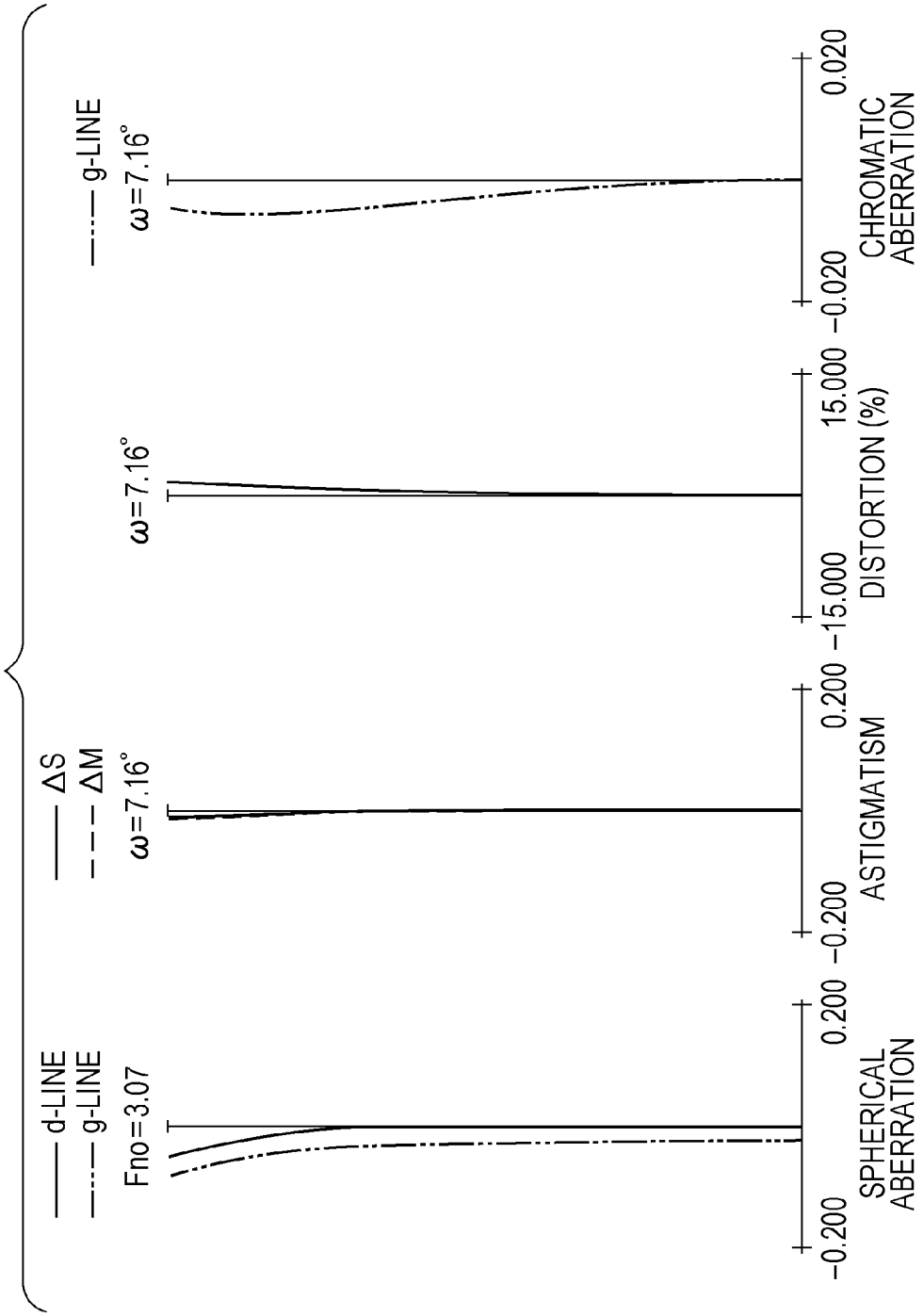

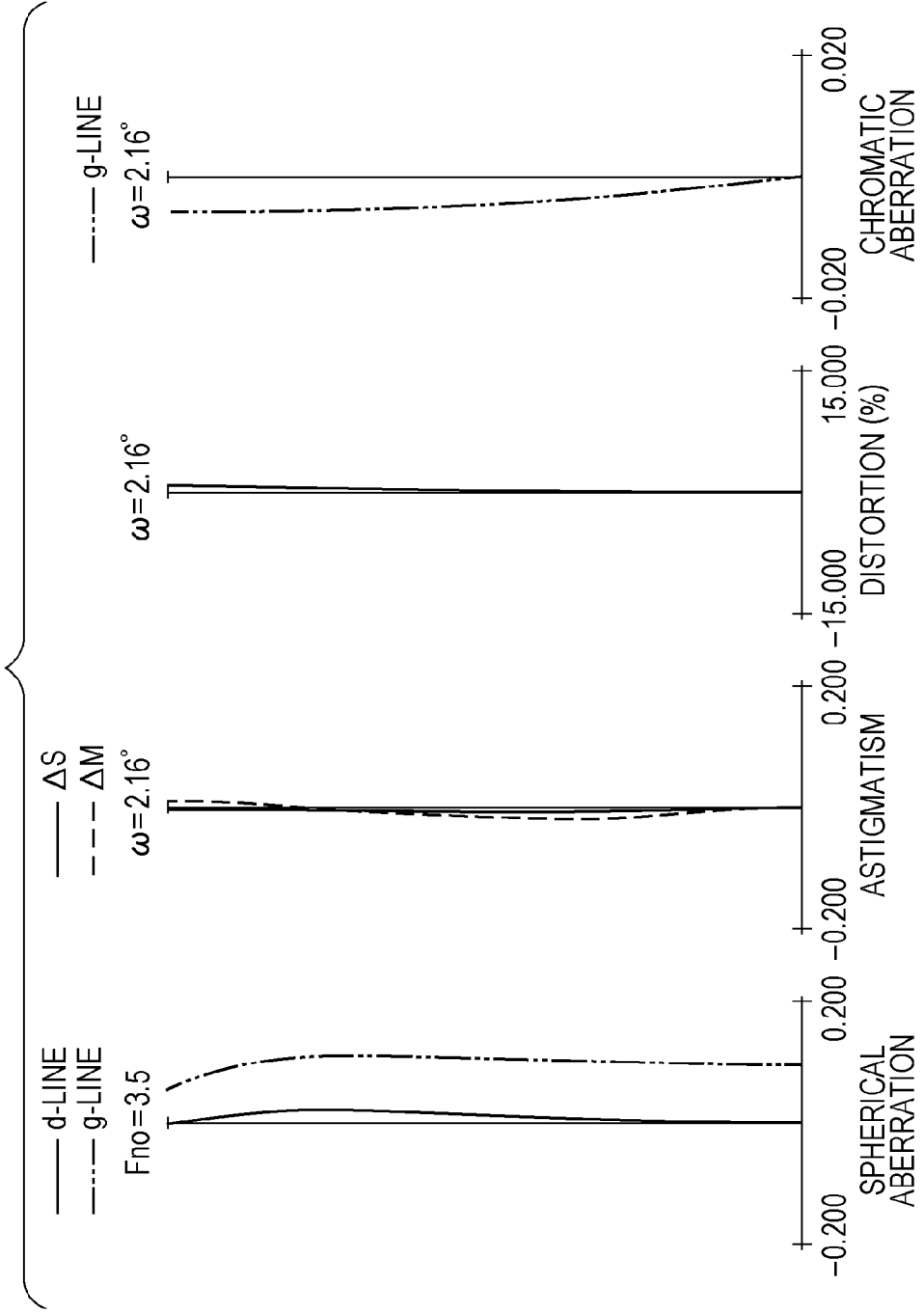

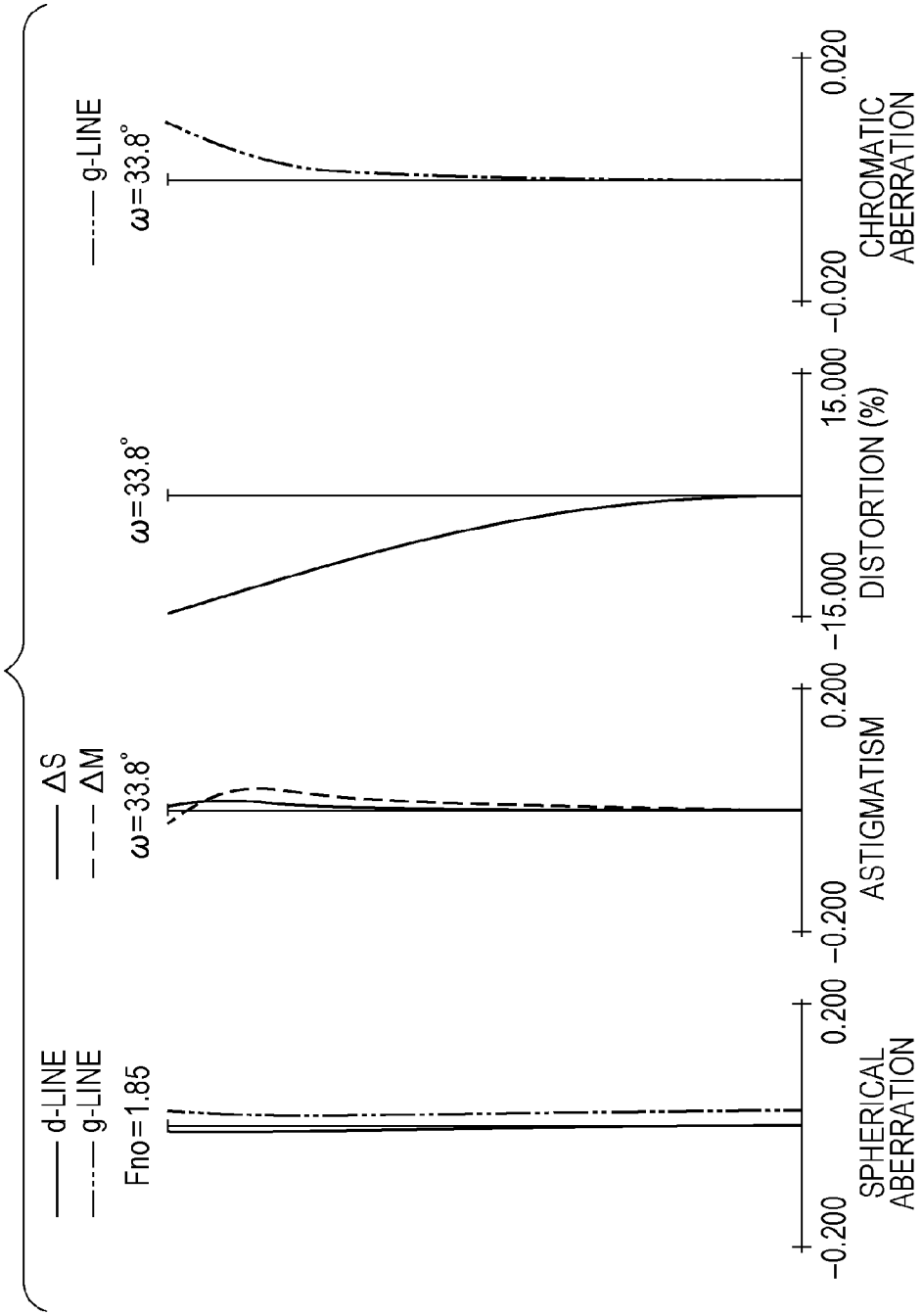

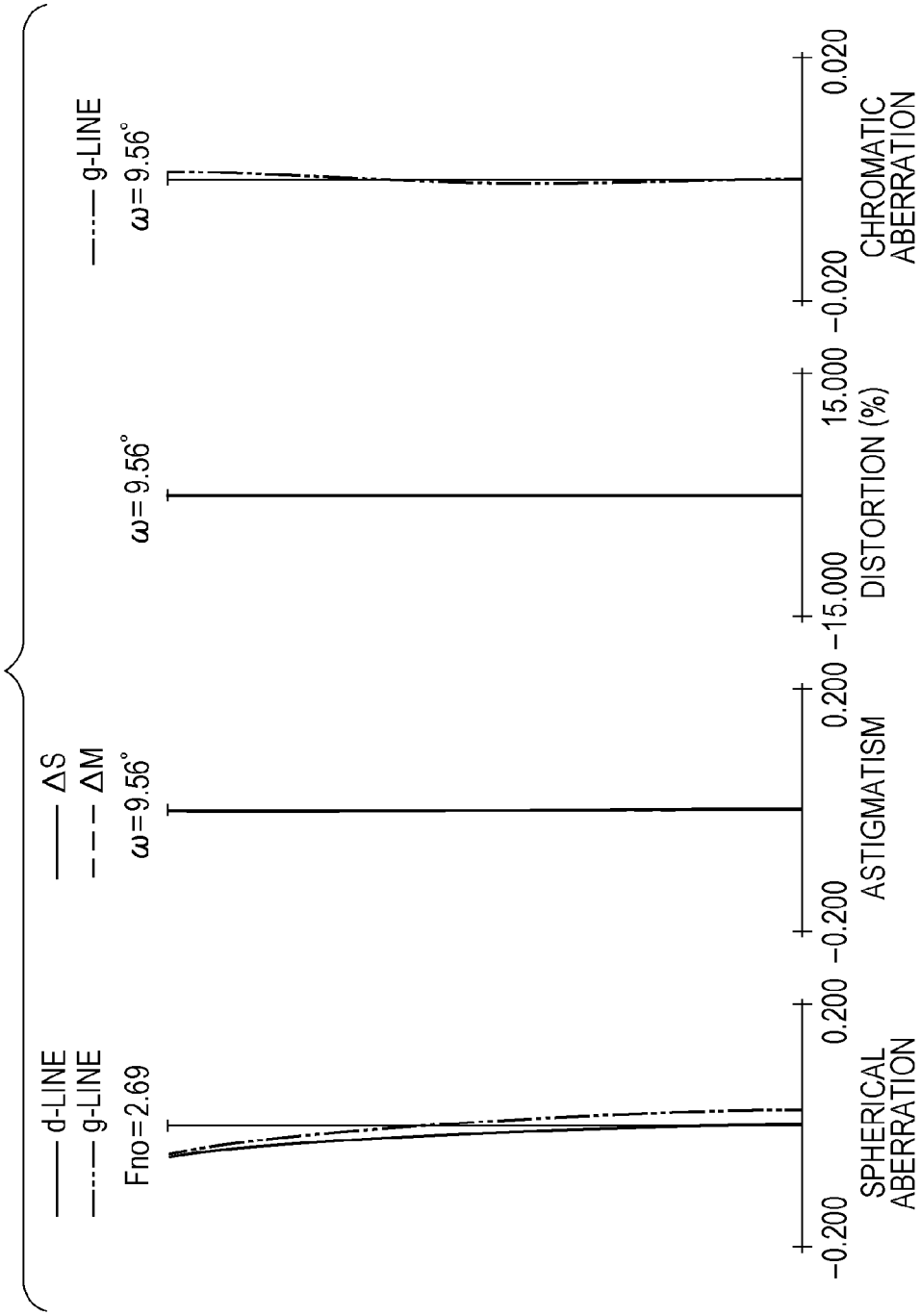

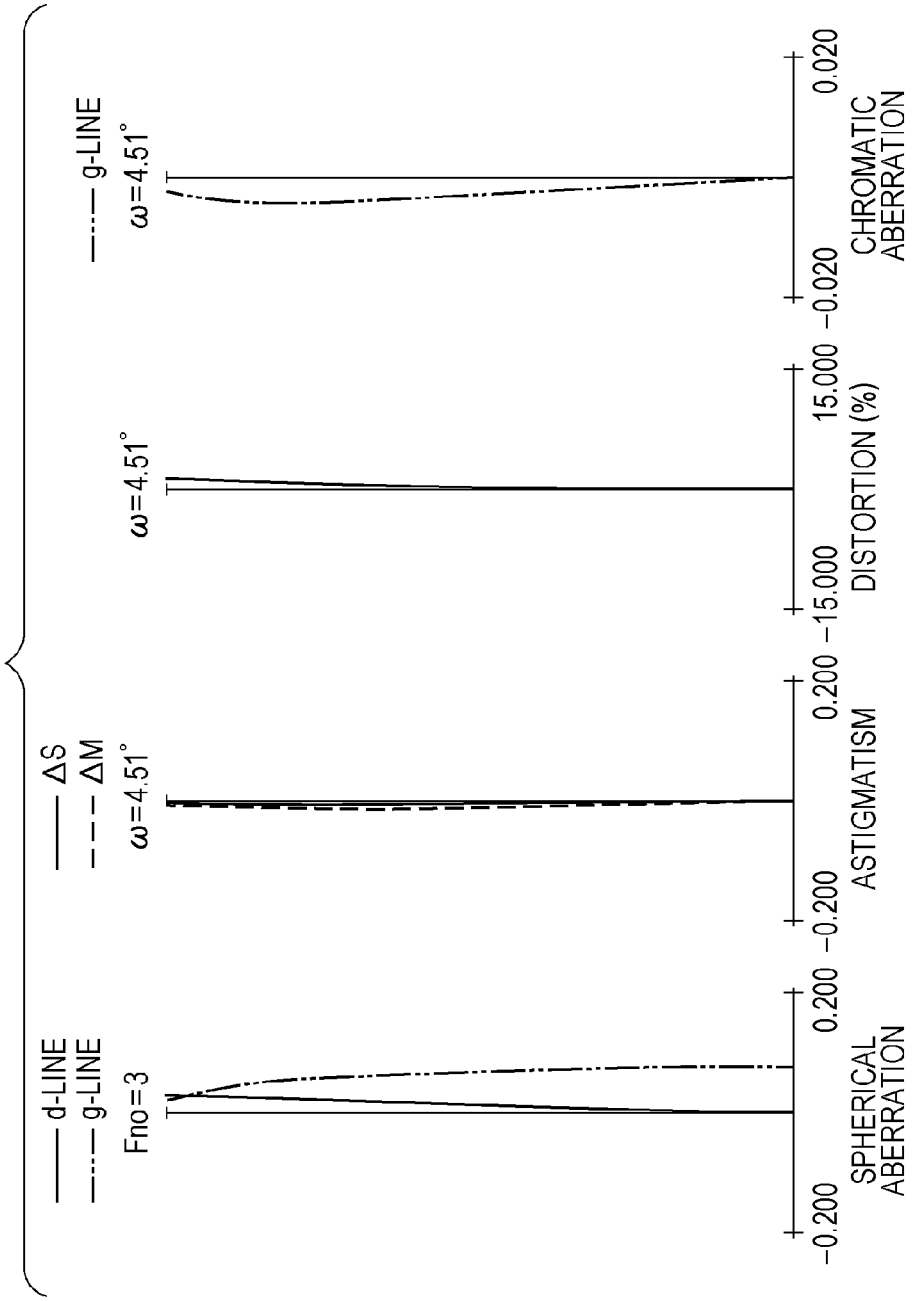

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, and, in particular, to a zoom lens that is suitable for a still camera, a video camera, a digital still camera, a monitoring camera, and the like.

2. Description of the Related Art

It is required that a zoom lens used as an image pickup optical system of an image pickup apparatus including a solid-state image pickup device have a small F-number, a wide view angle, a high optical performance, and a small size as its entirety. It is also required that a drive unit for moving a lens unit during zooming operate on reduced power, image shake during zooming be suppressed, and a first lens unit disposed nearest to the object side be fixed in place during zooming so that the strength of the lens barrel can be increased.

There is a know type of zoom lens, which is called a positive lead type, in which a lens unit having a positive refractive power is disposed nearest to the object side. A positive lead type zoom lens includes, from the object side to the image side, a first lens unit having a positive refractive power, a second lens unit having a negative refractive power, a third lens unit having a positive refractive power, a fourth lens unit having a negative refractive power, and a fifth lens unit having a positive refractive power.

US2011/0194015 and Japanese Unexamined Patent Application Publication No. 2000-180722 each disclose a zoom lens in which, during zooming, a first lens unit does not move while a plurality of other lens units move, and, during focusing, lens units other than the first lens units move.

US2011/0194015 discloses a zoom lens having an angle of view for shooting at the wide angle end of about 80 degrees, a zoom ratio of about 5 times, and an F-number at the wide angle end of about 3.6.

Japanese Unexamined Patent Application Publication No. 2000-180722 discloses a zoom lens having an angle of view for shooting at the wide angle end of about 63 degrees, a zoom ratio in the range of about 25 to 30, and an F-number at the wide angle end of about 1.45.

In order to increase the view angle of a positive lead type zoom lens, which includes a first lens unit that does not move during zooming, while maintaining a predetermined F-number and a good optical performance, it is necessary that the effective aperture of the first lens be considerably large and the size of the lens barrel be increased. If the refractive powers of lens units are increased to increase the view angle while maintaining a small size of the entire zoom lens, various aberrations occur by large amounts and it becomes difficult to appropriately correct such aberrations.

The present invention provides a zoom lens having a wide view angle, a high zoom ratio, and a high aperture ratio, and a small size as its entirety; and an image pickup apparatus including the zoom lens.

SUMMARY OF THE INVENTION

A zoom lens according to the present invention includes, from an object side to an image side, a first lens unit having a positive refractive power, a second lens unit having a negative refractive power, an aperture stop, a third lens unit having a positive refractive power, a fourth lens unit having a negative refractive power, and a fifth lens unit having a positive refractive power. During zooming, the first lens unit and the aperture stop do not move and the second, third, and fourth lens units move along different loci. The zoom lens satisfies a conditional expression $0.8<(\beta 2t/\beta 2w)/(\beta 3t/\beta 3w)<5.0$, where $\beta 2w$ and $\beta 2t$ are respectively lateral magnifications of the second lens unit at a wide angle end and at a telephoto end, and $\beta 3w$ and $\beta 3t$ are respectively lateral magnifications of the third lens unit at the wide angle end and at the telephoto end.

Further features of the present invention will become apparent from the following description of exemplary embodiments with reference to the attached drawings.

BRIEF DESCRIPTION OF THE DRAWINGS

FIG. 1 is a sectional view of a zoom lens according to a first embodiment at the wide angle end.

FIGS. 2A, 2B, and 2C are aberration charts of the zoom lens according to the first embodiment at the wide angle end, at an intermediate zooming position, and at the telephoto end, respectively.

FIG. 3 is a sectional view of a zoom lens according to a second embodiment at the wide angle end.

FIGS. 4A, 4B, and 4C are aberration charts of the zoom lens according to the second embodiment at the wide angle end, at an intermediate zooming position, and at the telephoto end, respectively.

FIGS. 6A, 6B, and 6C are aberration charts of the zoom lens according to the third embodiment at the wide angle end, at an intermediate zooming position, and at the telephoto end, respectively.

FIGS. 8A, 8B, and 8C are aberration charts of the zoom lens according to the fourth embodiment at the wide angle end, at an intermediate zooming position, and at the telephoto end, respectively.

FIGS. 10A, 10B, 10C are aberration charts of the zoom lens according to the fifth embodiment at the wide angle end, at an intermediate zooming position, and at the telephoto end, respectively.

DESCRIPTION OF THE EMBODIMENTS

Hereinafter, embodiments of the present invention will be described with reference to the attached drawings. A zoom lens according to the present invention includes, from the object side to the image side, a first lens unit having a positive refractive power, a second lens unit having a negative refractive power, an aperture stop, a third lens unit having a positive refractive power, a fourth lens unit having a negative refractive power, and a fifth lens unit having a positive refractive power. During zooming, the first lens unit and the aperture stop do not move, and the second to fourth lens units move along different loci. A lens unit having a refractive power may be disposed at least at one of a position on the object side of the first lens unit and a position on the image side of the fifth lens unit.

FIG. 1 is a sectional view of a zoom lens according to a first embodiment of the present invention at the wide angle end (short focal length end). FIGS. 2A, 2B, and 2C are aberration charts of the zoom lens according to the first embodiment at the wide angle end, at an intermediate zooming position, and at the telephoto end (long focal length end), respectively. The zoom lens according to the first embodiment has a zoom ratio of 29.54, an aperture ratio (F-number) in the range of 1.85 to 3.50, and an angle of view for shooting in the range of 72.66° to 3.36°.

FIG. 3 is a sectional view of a zoom lens according to a second embodiment of the present invention at the wide angle end. FIGS. 4A, 4B, and 4C are aberration charts of the zoom lens according to the second embodiment at the wide angle end, at an intermediate zooming position, and at the telephoto end, respectively. The zoom lens according to the second embodiment has a zoom ratio of 29.49, an aperture ratio (F-number) in the range of 1.85 to 3.50, and an angle of view for shooting in the range of 73.76° to 3.42°.

Figure 5:
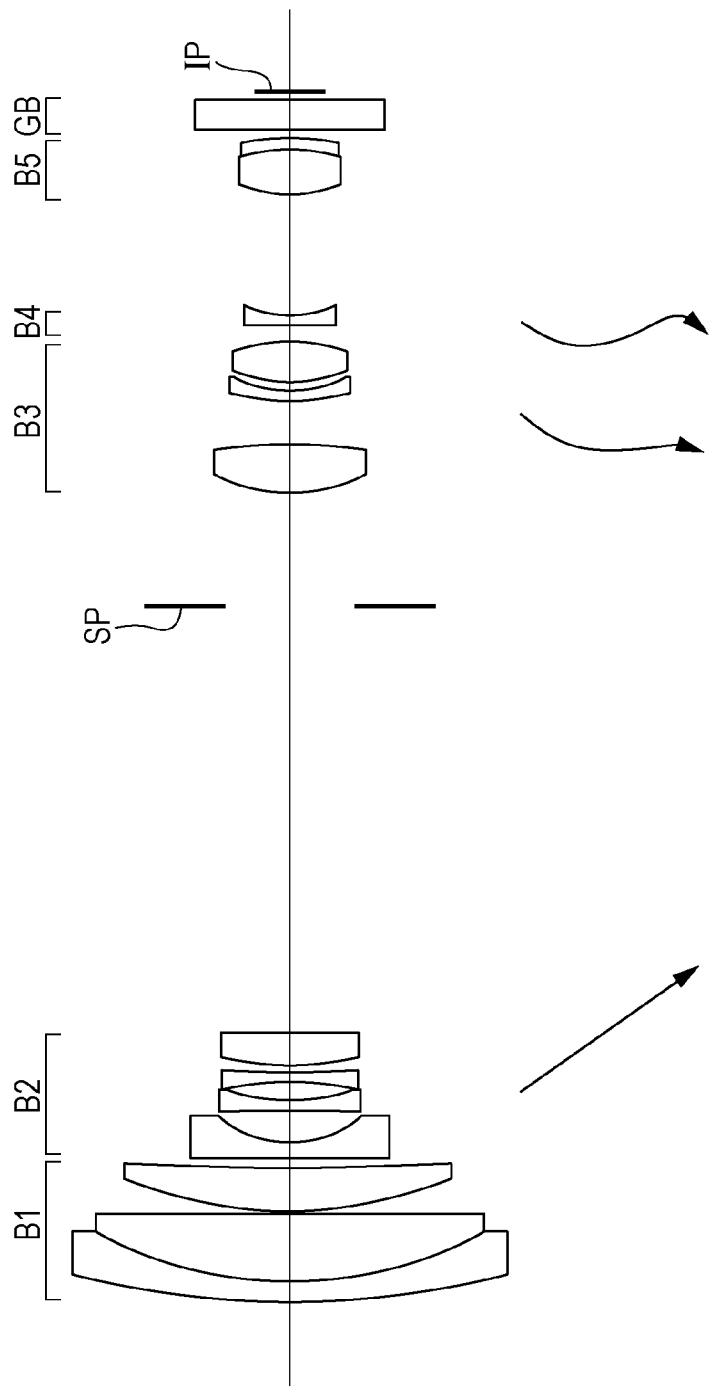
FIG. 5 is a sectional view of a zoom lens according to a third embodiment at the wide angle end.

FIG. 5 is a sectional view of a zoom lens according to a third embodiment of the present invention at the wide angle end. FIGS. 6A, 6B, and 6C are aberration charts of the zoom lens according to the third embodiment at the wide angle end, at an intermediate zooming position, and at the telephoto end, respectively. The zoom lens according to the third embodiment has a zoom ratio of 24.92, an aperture ratio (F-number) in the range of 1.85 to 3.50, and an angle of view for shooting in the range of 72.66° to 3.98°.

Figure 7:
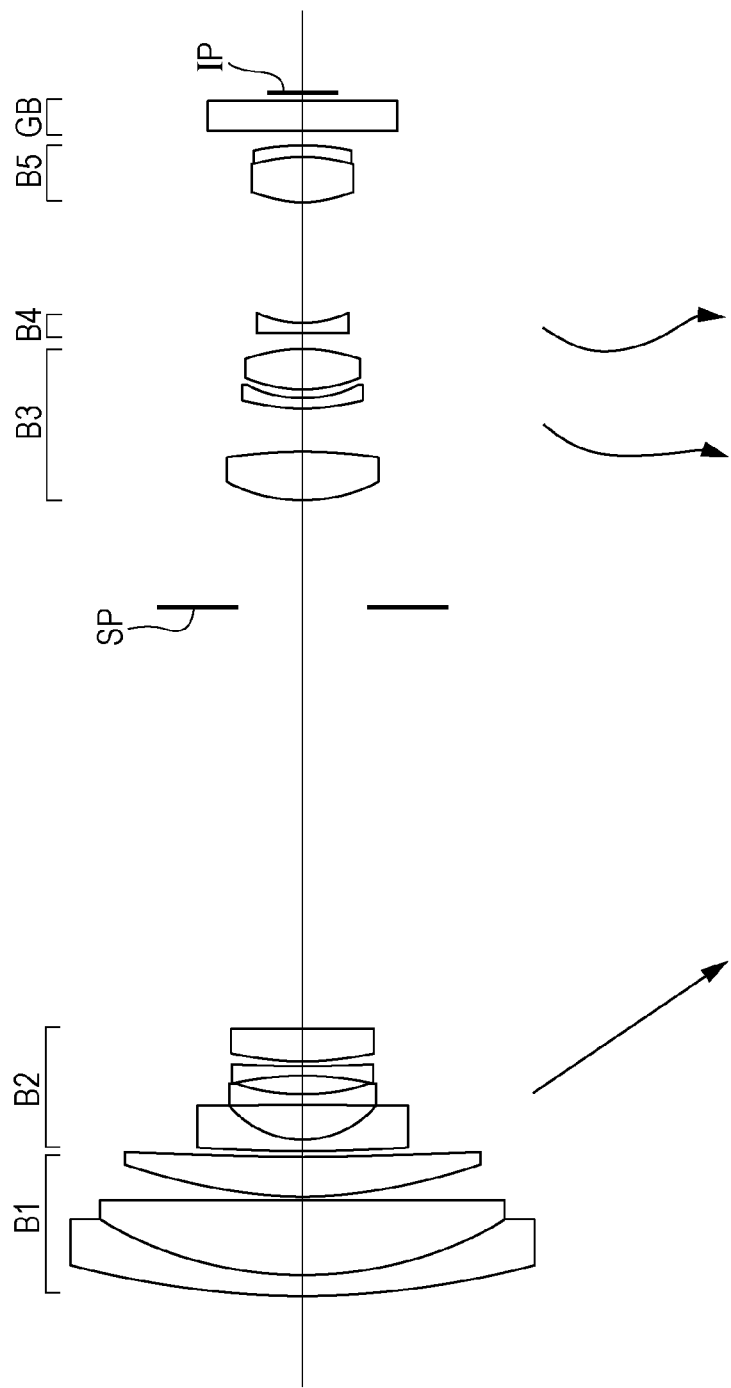
FIG. 7 is a sectional view of a zoom lens according to a fourth embodiment at the wide angle end.

FIG. 7 is a sectional view of a zoom lens according to a fourth embodiment of the present invention at the wide angle end. FIGS. 8A, 8B, and 8C are aberration charts of the zoom lens according to the fourth embodiment at the wide angle end, at an intermediate zooming position, and at the telephoto end, respectively. The zoom lens according to the fourth embodiment has a zoom ratio of 24.88, an aperture ratio (F-number) in the range of 1.85 to 3.50, and an angle of view for shooting in the range of 77.1° to 4.32°.

Figure 9:
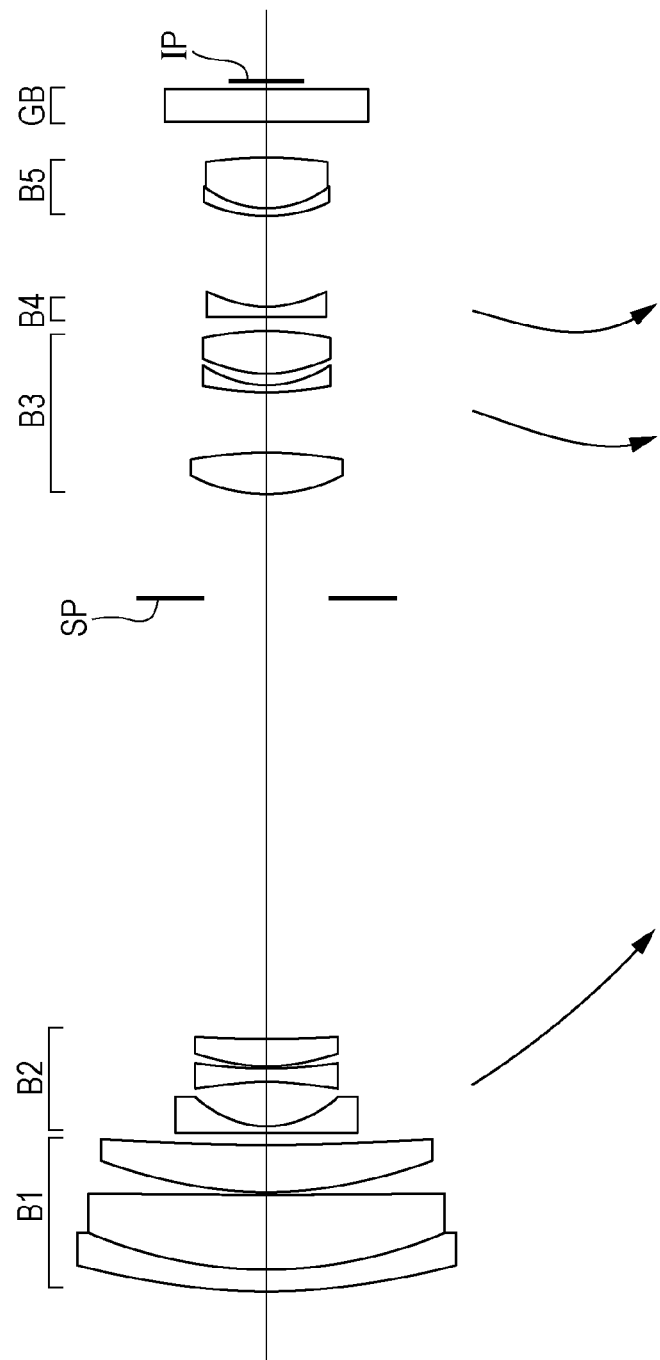
FIG. 9 is a sectional view of a zoom lens according to a fifth embodiment at the wide angle end.
Figure 11:
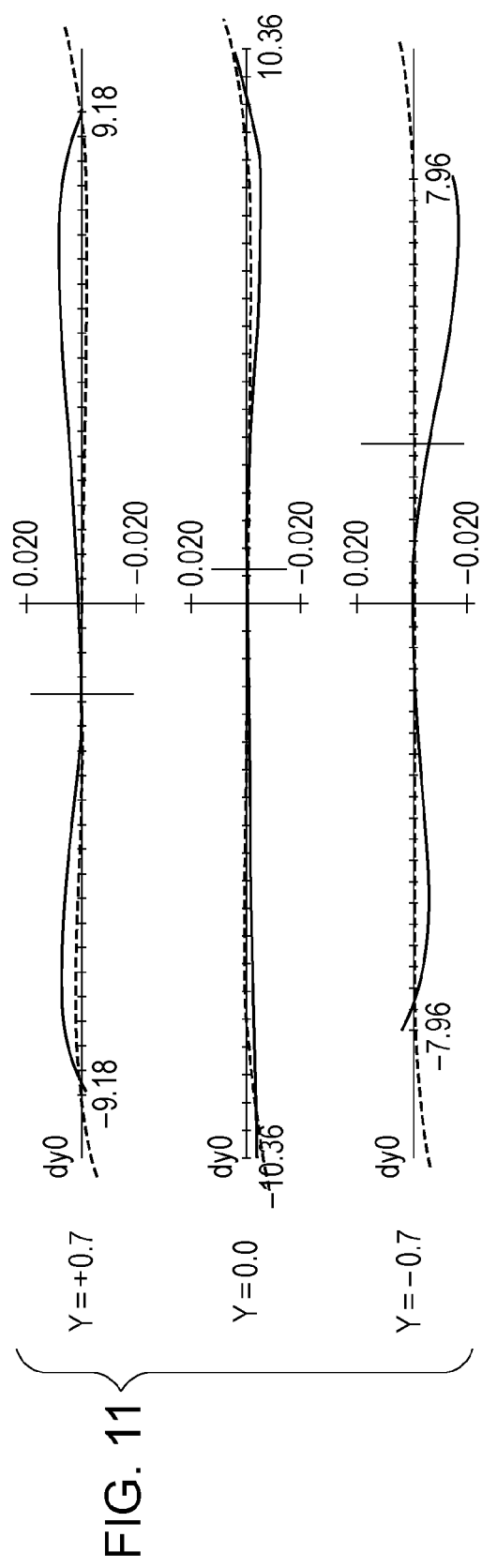
FIG. 11 illustrates lateral aberrations at the telephoto end that occur when a third lens unit of the zoom lens according to the first embodiment is moved to perform an image stabilization operation.
Figure 12:
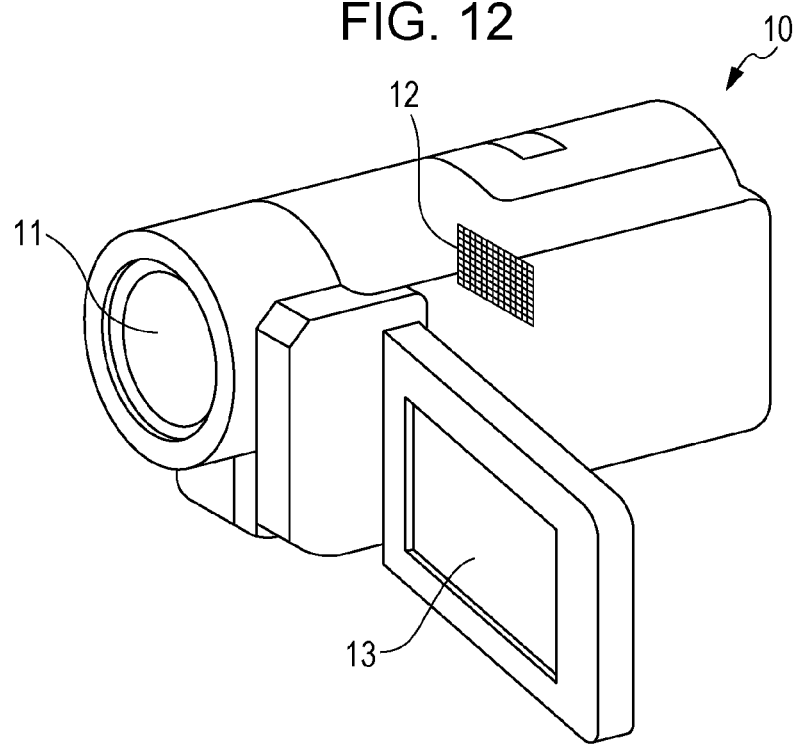
FIG. 12 is a schematic view of an image pickup apparatus according to the present invention.
Figure 13:
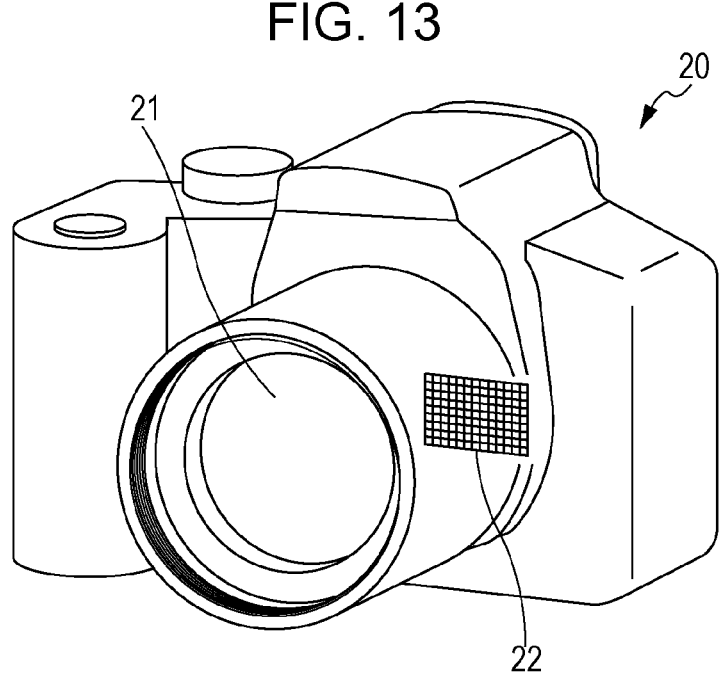
FIG. 13 is a schematic view of an image pickup apparatus according to the present invention.

FIG. 9 is a sectional view of a zoom lens according to a fifth embodiment of the present invention at the wide angle end. FIGS. 10A, 10B, 10C are aberration charts of the zoom lens according to the fifth embodiment at the wide angle end, at an intermediate zooming position, and at the telephoto end, respectively. The zoom lens according to the fifth embodiment has a zoom ratio of 10.00, an aperture ratio (F-number) in the range of 1.85 to 3.00, and an angle of view for shooting in the range of 67.66° to 9.02°. FIG. 11 illustrates lateral aberrations at the telephoto end that occur when a third lens unit of the zoom lens according to the first embodiment is moved to perform an image stabilization operation. FIGS. 12 and 13 are each a schematic view of an image pickup apparatus according to the present invention.

A zoom lens according to the present invention is used for image pickup apparatuses, such as a digital camera, a video camera, and a silver-halide film camera; observation instruments such as a telescope and binoculars; and optical apparatuses such as a copying machine and a projector. In the sectional views of zoom lenses, the left side is the front side (object side, magnification side) and the right side is the rear side (image side, reduction side). In the sectional views of zoom lenses, Bi denotes the i-th lens unit, where i is the order of the lens unit from the object side toward the image side.

Next, the zoom lenses according to the embodiments will be described. In the sectional views of the zoom lenses according to the embodiments, B1 denotes a first lens unit having a positive refractive power (optical power, the reciprocal of the focal length), B2 denotes a second lens unit having a negative refractive power, B3 denotes a third lens unit having a positive refractive power, B4 denotes a fourth lens unit having a negative refractive power, and B5 is a fifth lens unit having a positive refractive power. SP denotes a component that functions as an aperture stop for determining (limiting) the diameter of a light beam for the full aperture F-number (Fno) (hereinafter referred to as "aperture stop"). The aperture stop is located between the second lens unit B2 and the third lens unit B3.

GB denotes an optical block, which corresponds to an optical filter, a face plate, a quartz low-pass filter, an infrared cut-off filter, or the like. IP denotes the image plane, which corresponds to the image pickup plane of an image pickup device (photoelectric conversion element) such as a CCD sensor or a CMOS sensor when the zoom lens is used as an image pickup optical system of a video camera or a digital still camera. When the zoom lens is used as an image pickup optical system of a silver-halide film camera, the image plane corresponds to the photosensitive surface of the camera, which is a surface of a film.

In the spherical aberration charts, a solid line represents the spherical aberration for the d-line and a two-dot chain line represents the spherical aberration for the g-line. In the astigmatism charts, a broken line represents the meridional image plane, and a solid line represents the sagittal image plane. Transverse chromatic aberration charts show the transverse chromatic aberration for the g-line. Fno denotes the F-number and ω denotes the half angle of view. In the sectional views of the zoom lenses, arrows indicate the loci along which the lens units move during zooming from the wide angle end to the telephoto end. In the embodiments described below, the wide angle end and the telephoto end are zooming positions at which variator lens units are located at both ends of a range over which the variator lens units can move along the optical axis.

The zoom lenses according to the embodiments have a wide view angle, a high zoom ratio, and a high aperture ratio. To be specific, the zoom lenses have an angle of view 2ω for shooting in the range of 73 to 67 at the wide angle end, a zoom ratio in the range of about 20 to 10, and an aperture ratio in the range of about 1.8 to 3.0.

In the embodiments, during zooming from the wide angle end to the telephoto end, magnification is mainly changed by moving the second lens unit B2 toward the image side. Magnification is also changed by moving the third lens unit B3. Variation of the image plane that occurs due to a change in magnification is corrected by non-linearly moving the fourth lens unit B4. The first lens unit B1, the fifth lens unit B5, and the aperture stop SP do not move during zooming.

With the embodiments, a high performance is maintained while realizing a wide view angle and a high zoom ratio by increasing the refractive power of second lens unit B2 to a level at which the conditional expression (2) described below is satisfied and by appropriately sharing a magnification-changing function between the second lens unit B2 and the third lens unit.

To simplify the mechanism for zooming and to reduce the size of the zoom lens including the lens barrel mechanism, the fifth lens unit B5 does not move during zooming. The zoom lenses are of a rear-focusing type, with which focusing is performed by moving the fourth lens unit B4 along the optical axis. When focusing from an object at infinity to an object at a short distance, the fourth lens unit B4 is moved backward. The imaging forming position may be moved in a direction perpendicular to the optical axis by moving the entirety or a part of the third lens unit B3 in a direction having a component perpendicular to the optical axis. That is, image stabilization may be performed.

To increase the view angle, the zoom ratio, and the aperture ratio, and to appropriately correct various aberrations, the zoom lenses according to the embodiments include, from the object side to the image side, a lens unit having a positive refractive power, a lens unit having a negative refractive power, an aperture stop, a lens unit having a positive refractive power, a lens unit having a negative refractive power, and a lens unit having a positive refractive power. A collecting effect and a diffusion effect are sequentially combined by alternately disposing a lens unit having a positive refractive power and a lens unit having a negative refractive power from the object side to the image side. As a result, various aberrations that occur when the view angle and the aperture ratio are increased are corrected.

The second lens unit B2 is used as the main variator lens unit and the magnification-changing function is appropriately shared between the second lens unit B2 and the third lens unit B3. As a result, variations of aberrations during zooming are appropriately corrected, even through the F-number is small (so as to be capable of capturing a bright image). Variation of the image plane during zooming is corrected using the fourth lens unit B4. Because the aperture stop SP does not move during zooming, it is not necessary to provide a driving device or the like for moving the aperture stop. As a result, the weight of the entirety of the lens barrel is reduced.

The embodiments satisfy a conditional expression $$0.8<(\beta2t/\beta2w)/(\beta3t/\beta3w)<5.0 \tag{1},$$

where $\beta2w$ and $\beta2t$ are respectively the lateral magnifications of the second lens unit B2 at the wide angle end and at the telephoto end, and $\beta3w$ and $\beta3t$ are respectively the lateral magnifications of the third lens unit B3 at the wide angle end and at the telephoto end.

The conditional expression (1) represents a condition for realizing a wide view angle and a high zoom ratio. The conditional expression (1) appropriately determines the relationship between the ratio of the lateral magnification of the third lens unit B3 (sub-variator lens unit) at the telephoto end to that at the wide angle end and the ratio of the lateral magnification of the second lens unit B2 (main variator lens unit) at the telephoto end to that the wide angle end.

When the conditional expression (1) is satisfied, the magnification-changing function is appropriately shared between the second lens unit B2 (main variator lens unit) and the third lens unit B3 (sub-variator lens unit). If the upper limit of the conditional expression (1) is not satisfied, the share of the magnification-changing function of the third lens unit B3 is too small. In this case, the share of the magnification-changing function of the second lens unit B2 is large, and it is necessary to increase the amount of movement of the second lens unit B2 in order to realize a higher zoom ratio. As a result, it becomes difficult to reduce the size of the entire zoom lens.

If the lower limit of the conditional expression (1) is not satisfied, the share of the magnification-changing function of the third lens unit B3 is too large. In this case, although it is easy to increase the view angle and the zoom ratio to intended levels, various aberrations increase as the view angle increases. In particular, spherical aberration and coma increase, and it becomes difficult to correct these aberrations and to achieve a high performance.

It is more preferable that the range of the conditional expression (1) be as follows.

$$0.9<(\beta2t/\beta2w)/(\beta3t/\beta3w)<4.5 \tag{1a}$$

It is more preferable that the range of the conditional expression (1a) be as follows.

$$1.0<(\beta2t/\beta2w)/(\beta3t/\beta3w)<4.2 \tag{1b}$$

As described above, with the embodiments, the view angle is increased while maintaining a small F-number. Moreover, a good optical performance over the entire zoom range from the wide angle end to the telephoto end is obtained by keeping the first lens unit B1 and the aperture stop SP stationary during zooming and maintaining the effective diameter of the front lens at a small value.

It is more preferable that the embodiments satisfy one or more of the following conditional expressions:

$$-2.5<f2/fw<-1.5 \tag{2},$$

$$2.5<f3/fw<5.5 \tag{3},$$

$$65.0<vp3 \tag{4},$$

$$vn3<35.0 \tag{5},$$

$$1.8<Nn3 \tag{6, and}$$

$$-0.4<f4/ft<-0.1 \tag{7},$$

where f2 is the focal length of the second lens unit B2, f3 is the focal length of the third lens unit B3, f4 is the focal length of the fourth lens unit B4, fw is the focal length of the entire zoom lens at the wide angle end, ft is the focal length of the zoom lens at the telephoto end, vp3 is the Abbe number of the material of at least one positive lens included in the third lens unit B3, and vn3 and Nn3 are respectively the Abbe number and the refractive index of at least one negative lens included in the third lens unit B3.

Next, the technical meanings of these conditional expressions will be described.

The conditional expression (2) appropriately determines the relationship between the ratio of the focal length of the second lens unit B2 (main variator lens unit) and the focal length of the entire zoom lens at the wide angle end.

If the upper limit of the conditional expression (2) is not satisfied, the focal length of the second lens unit B2 is too small. In this case, various aberrations increase, although it is easy to achieve intended angle of view and zoom ratio. In particular, variation of the field curvature during zooming increases, and it becomes difficult to appropriately correct the field curvature over the entire zoom range. If the lower limit of the conditional expression (2) is not satisfied, the focal length of the second lens unit B2 is too large. In this case, to achieve intended angle of view and zoom ratio, it is necessary to increase the amount of movement of the second lens unit B2 during zooming, and it becomes difficult to reduce the size of the entire zoom lens.

The conditional expression (3) appropriately determines the ratio of the focal length of the third lens unit B3 (sub-zoom lens unit) to the focal length of the entire zoom lens at the wide angle end. If the upper limit of the conditional expression (3) is not satisfied, the focal length of the third lens unit B3 is too large. In this case, to achieve an intended zoom ratio, it is necessary to increase the amount of movement of the third lens unit B3 during zooming, and it becomes difficult to reduce the size of the entire zoom lens. If the lower limit of the conditional expression (3) is not satisfied, the focal length of the third lens unit B3 is too small. In this case, various aberrations increase and, in particular, coma increases at the wide angle end, and it becomes difficult to appropriately correct such the coma.

The conditional expression (4) determines a preferable range of the Abbe number of the material of at least one positive lens included in the third lens unit B3. If the upper limit of the conditional expression (4) is not satisfied, the spherical aberration and the coma increase at the wide angle end, because a low dispersion lens material usually have a low refractive index, and it becomes difficult to correct such aberrations. If the lower limit of the conditional expression (4) is not satisfied, it becomes difficult to correct the axial chromatic aberration at the telephoto end. It is more preferable that the third lens unit B3 include two or more lenses having a positive refractive power and the material of each of the positive lenses satisfy the conditional expression (4).

The conditional expressions (5) and (6) respectively determine preferable ranges of the Abbe number and the refractive index of the material of at least one negative lens included in the third lens unit B3. If the upper limit of the conditional expression (5) is not satisfied, the axial chromatic aberration at the telephoto end increases as the zoom ratio is increased, and it becomes difficult to correct the axial chromatic aberration. If the lower limit of the conditional expression (6) is not satisfied, the transverse chromatic aberration at the wide angle end increases as the view angle is increased, and it becomes difficult to correct the transverse chromatic aberration.

The conditional expression (7) is preferable for a case where the fourth lens unit B4, which is used for focusing, includes a single lens. The conditional expression (7) appropriately determines the ratio of the focal length of the fourth lens unit B4 to the focal length of the entire zoom lens at the telephoto end. If the upper limit of the conditional expression (7) is not satisfied, the focal length of the fourth lens unit B4 is too small. In this case, although the amount of movement of the fourth lens unit B4 when performing focusing can be reduced, it is necessary to provide a micro movement mechanism and a controller, and the size of the entire lens barrel increase due to the presence of such a drive unit, which is not preferable.

If the lower limit of the conditional expression (7) is not satisfied, the focal length of the fourth lens unit B4 is too large. In this case, the amount of movement of the fourth lens unit B4 during focusing becomes too large, and it becomes difficult to reduce the size of the entire zoom lens.

It is more preferable that the ranges of the conditional expressions (2) to (7) be as follows.

$$-2.3 < f2/fw < -1.7 \quad (2a)$$

$$2.8 < f3/fw < 5.0 \quad (3a)$$

$$68.0 < vp3 \quad (4a)$$

$$vn3 < 32.0 \quad (5a)$$

$$1.9 < Nn3 \quad (6a)$$

$$-0.35 < f4/ft < -0.13 \quad (7a)$$

It is more preferable that the ranges of the conditional expressions (2a) to (7a) be as follows.

$$-2.1 < f2/fw < -1.8 \quad (2b)$$

$$3.0 < f3/fw < 4.5 \quad (3b)$$

$$80.0 < vp3 < 96.0 \quad (4b)$$

$$24 < vn3 < 30.0 \quad (5b)$$

$$1.95 < Nn3 < 2.05 \quad (6b)$$

$$-0.30 < f4/ft < -0.15 \quad (7b)$$

As described above, with the embodiments, the refractive powers of the lens units and the share of the magnification-changing function between the lens units are appropriately set.

Thus, the view angle and the zoom ratio are increased while maintaining a small F-number, the first lens unit B1 and the diaphragm SP do not move during zooming, and the effective diameter of the front lens is maintained to be small. As a result, a zoom lens having a good optical performance over the entire zoom range from the wide angle end and the telephoto end is obtained.

In the embodiments, it is preferable that the fourth lens unit include one or more aspherical surface. In this case, various aberrations can be appropriately corrected while reducing the number of lenses and the weight of the entire zoom lens.

In the embodiments, the first lens unit B1 includes, from the object side to the image side, a cemented lens 100 in which a negative lens 100n and a positive lens 100p are cemented to each other, and a positive lens 102.

The second lens unit B2 includes, from the object side to the image side, at least two negative lenses and a positive lens. In FIG. 1, the second lens unit B2 includes, a first negative lens 201, a second negative lens 202, a third negative lens 203 and a positive lens 204. The third lens unit B3 includes, from the object side to the image side, a positive lens 301, a negative lens 302, and a positive lens 303. The fourth lens unit B4 consists of a single negative lens 400. The fifth lens unit B5 includes a cemented lens 500 in which a positive lens 500p and a negative lens 500n are cemented to each other.

By configuring the lens units as described above, a zoom lens having a wide view angle and a high zoom ratio as well as a small F-number is realized.

In recent years, it has been required that a zoom lens used for an image pickup apparatus include a mechanism for correcting image blurring that occurs when the entire optical system is vibrated (tilted) and maintain a high optical performance even while correction of image blurring is being performed.

With the zoom lenses according to the embodiments, image blurring is corrected while maintaining a high optical performance by moving the third lens unit B3 in a direction having a component perpendicular to the optical axis. Because the third lens unit B3 has a small effective aperture, it is easy to provide a driving device for moving the third lens group B3 in a direction having a component perpendicular to the optical axis and it is easy to reduce the size of the entire lens barrel by using a small driving device.

FIG. 11 illustrates lateral aberrations that occur when the third lens unit B3 of the zoom lens according to the first embodiment is moved in a direction having a component perpendicular to the optical axis so as to perform an image stabilization operation for correcting image blurring that occurs when the zoom lens is vibrated (tilted). FIG. 11 illustrates lateral aberrations, for the d-line at the telephoto end, that occur when an operation for correcting image blurring when the zoom lens is tilted by 0.3 degrees is performed. The middle chart shows the lateral aberration on the axis (Y=0.0), the upper chart shows the lateral aberration at an image height Y that is above the axis by 70% of the maximum image height, and the lower chart shows the lateral aberration at an image height Y that is below the axis by 70% of the maximum image height.

In the embodiments, it is more preferable that the third lens unit B3 include one or more aspherical surface, and image blurring be corrected by moving the entirety or a part of the third lens unit B3 in a direction having a component perpendicular to the optical axis direction. Because the third lens unit B3 is disposed adjacent to the aperture stop SP, it becomes easy to suppress decentering coma that occurs while an operation for correcting image blurring is being corrected.

Next, referring to FIG. 12, an embodiment of a digital video camera including a zoom lens according to the present invention as an image pickup optical system will be described. The digital video camera illustrated in FIG. 12 includes a camera body 10 and an image pickup optical system 11, which is a zoom lens according to one of the first to fifth embodiments. The digital video camera also includes a solid-state image pickup device 12 (photoelectric conversion element) disposed in the camera body. The solid-state image pickup device 12 is a CCD sensor, a CMOS sensor, or the like, which captures an object image formed by the image pickup optical system 11. The captured image of the object can be observed via a viewfinder 13. Referring to FIG. 13, an embodiment of a digital still camera (single-lens reflex camera) including a zoom lens according to the present invention as an image pickup optical system will be described.

The digital still camera illustrated in FIG. 13 includes a camera body 20 and an image pickup optical system 21, which is a zoom lens according to one of the first to fifth embodiments. The digital still camera also includes a solid-state image pickup device 22 (photoelectric conversion element) disposed in the camera body. The solid-state image pickup device 22 is a CCD sensor, a CMOS sensor, or the like, which captures an object image formed by the image pickup optical system 21. Likewise, a zoom lens according to the present invention can be used for a lens shutter camera. Thus, an image pickup apparatus having a small size and a high optical performance can be realized by using the zoom lens according to the present invention as an image pickup apparatus such as a digital still camera, a video camera, or the like.

The zoom lenses according to the embodiments can be used as a projection optical system for a projection apparatus (projector).

An image pickup apparatus according to the present invention includes one of the zoom lenses described above and a circuit for electrically correcting at least one of the distortion and the transverse chromatic aberration. By providing such a circuit for correcting the distortion of the zoom lens, it becomes easy to reduce the number of lenses and the size of the zoom lens. By electrically correcting the transverse chromatic aberration, color blurring of a captured image can be reduced and the resolving power can be increased.

Next, numerical examples corresponding to the embodiments of the present invention will be described. In the numerical examples, "i" denotes the order of a surface from the object side. In the numerical examples, "ri" denotes the radius of curvature of the i-th lens surface from the object side. "di" denotes the thickness of the i-th lens or an air space. "ndi" and "vdi" respectively denote the refractive index and the Abbe number of the glass material of i-th lens from the object side for the d-line. The last two surfaces are glass blocks. The aspherical shape is represented by the following equation:

$$X = \frac{(1/R)H^2}{1 + \sqrt{1 - (1+K)(H/R)^2}} + A4 \times H^4 + A6 \times H^6 + A8 \times H^8 + A10 \times H^{10} + A12 \times H^{12},$$

where the X-axis extends along the optical axis, the H-axis extends in a direction perpendicular to the optical axis, light propagates in a positive direction, R is the paraxial radius of curvature, K is the conic constant, and A4, A6, A8, A10, A12 are aspherical coefficients.

"e+X" and "e−X" respectively represent "$\times 10^{+x}$" and "$\times 10^{-x}$". "BF" denotes the back focus, which is the distance from the last lens surface to the paraxial image plane expressed in terms of an equivalent air length. The total lens length is the sum of the back focus BF and the distance from the first lens surface to the last lens surface. An aspherical surface is represented by a surface number and "*". The aperture stop SP and the glass block G are each shown as an independent unit. Therefore, each embodiment includes seven units. Table 1 shows the values of the parameters used in the conditional expressions described above for the numerical examples.

FIRST NUMERICAL EXAMPLE

| Unit mm | | | | |
|---------|---|---|---|---|
| Surface Data | | | | |
| Surface No. | r | d | nd | vd |
| 1 | 55.857 | 1.20 | 1.85478 | 24.8 |
| 2 | 23.237 | 4.00 | 1.63854 | 55.4 |
| 3 | 1162.831 | 0.15 | | |
| 4 | 28.334 | 2.50 | 1.80400 | 46.6 |
| 5 | 133.766 | (variable) | | |
| 6 | 6397.449 | 0.80 | 1.88300 | 40.8 |
| 7 | 6.289 | 1.90 | | |
| 8 | 118.048 | 0.60 | 1.83481 | 42.7 |
| 9 | 11.645 | 1.20 | | |
| 10 | −18.132 | 0.60 | 1.80400 | 46.6 |
| 11 | 119.045 | 0.30 | | |
| 12 | 16.494 | 2.00 | 1.95906 | 17.5 |
| 13 | −329.988 | (variable) | | |
| 14(stop) | ∞ | (variable) | | |
| 15* | 9.896 | 2.80 | 1.55332 | 71.7 |
| 16* | −23.448 | 2.60 | | |
| 17 | 15.263 | 0.60 | 2.00100 | 29.1 |
| 18 | 7.609 | 0.50 | | |
| 19 | 8.864 | 2.50 | 1.49700 | 81.5 |
| 20 | −11.963 | (variable) | | |
| 21* | −2329.977 | 0.60 | 1.55332 | 71.7 |
| 22* | 6.609 | (variable) | | |
| 23 | 8.155 | 2.73 | 1.59522 | 67.7 |
| 24 | −9.260 | 0.65 | 1.84666 | 23.8 |
| 25 | −17.795 | 1.87 | | |
| 26 | ∞ | 1.78 | 1.54400 | 60.0 |
| 27 | ∞ | 1.20 | | |
| image plane | ∞ | | | |

| Aspherical Surface Data |
|---|

15th surface

K = −3.31466e−001 A4 = −9.40085e−005 A6 = 3.91165e−007
A8 = 6.00236e−009 A10 = 3.75997e−010 A12 = −6.47418e−011

16th surface

K = −1.03245e+001 A4 = 1.37361e−004 A6 = 3.10899e−007
A8 = 3.75177e−009 A10 = −3.13924e−010 A12 = −6.89459e−011

21st surface

K = 6.49081e+005 A4 = −4.46534e−005 A6 = 2.64254e−005
A8 = −7.40796e−007 A10 = −1.81608e−007

22nd surface

K = −3.97997e−001 A4 = 1.04662e−004 A6 = 1.91884e−005
A8 = −1.34853e−006 A10 = 5.06561e−007 A12 = −8.45556e−008

-continued

Unit mm

Various Data
Zoom Ratio 29.54

|  | Wide Angle | Intermediate | Telephoto |
|---|---|---|---|
| Focal Length | 2.60 | 20.61 | 76.82 |
| F-number | 1.85 | 3.07 | 3.50 |
| Half Angle of View (degrees) | 36.33 | 6.23 | 1.68 |
| Image Height | 1.91 | 2.25 | 2.25 |
| Overall Lens Length | 73.07 | 73.07 | 73.07 |
| BF | 4.23 | 4.23 | 4.23 |
| d5 | 0.66 | 18.92 | 25.33 |
| d13 | 25.05 | 6.79 | 0.38 |
| d14 | 6.73 | 1.44 | 0.38 |
| d20 | 0.97 | 6.05 | 5.99 |
| d22 | 7.21 | 7.40 | 8.54 |

Zoom Lens Unit Data

| Unit No. | Front Surface | Focal Length |
|---|---|---|
| 1 | 1 | 36.20 |
| 2 | 6 | −5.05 |
| 3 | 14 | ∞ |
| 4 | 15 | 10.67 |
| 5 | 21 | −11.91 |
| 6 | 23 | 11.11 |
| 7 | 26 | ∞ |

SECOND NUMERICAL EXAMPLE

Unit mm

Surface Data

| Surface No. | r | d | nd | νd |
|---|---|---|---|---|
| 1 | 51.787 | 1.20 | 1.85478 | 24.8 |
| 2 | 24.448 | 4.00 | 1.59522 | 67.7 |
| 3 | −5084.796 | 0.15 | | |
| 4 | 28.688 | 2.50 | 1.80400 | 46.6 |
| 5 | 127.204 | (variable) | | |
| 6 | −1293.624 | 0.80 | 1.88300 | 40.8 |
| 7 | 6.262 | 1.90 | | |
| 8 | 118.048 | 0.60 | 1.83481 | 42.7 |
| 9 | 11.281 | 1.20 | | |
| 10 | −17.887 | 0.60 | 1.80400 | 46.6 |
| 11 | 128.375 | 0.30 | | |
| 12 | 16.494 | 2.00 | 1.95906 | 17.5 |
| 13 | −153.819 | (variable) | | |
| 14(stop) | ∞ | (variable) | | |
| 15* | 9.963 | 2.80 | 1.55332 | 71.7 |
| 16* | −21.228 | 2.60 | | |
| 17 | 15.014 | 0.60 | 2.00100 | 29.1 |
| 18 | 7.609 | 0.50 | | |
| 19 | 8.956 | 2.50 | 1.43875 | 94.9 |
| 20 | −10.000 | (variable) | | |
| 21* | −2344.892 | 0.60 | 1.55332 | 71.7 |
| 22* | 6.609 | (variable) | | |
| 23 | 8.056 | 2.73 | 1.59522 | 67.7 |
| 24 | −9.731 | 0.65 | 1.84666 | 23.8 |
| 25 | −17.795 | 1.87 | | |
| 26 | ∞ | 1.78 | 1.54400 | 60.0 |
| 27 | ∞ | 1.20 | | |
| image plane | ∞ | | | |

-continued

Unit mm

Aspherical Surface Data

15th surface

K = −3.29101e−001 A4 = −9.89697e−005 A6 = 7.19183e−007
A8 = −1.87197e−008 A10 = 3.15287e−010 A12 = −4.65304e−011

16th surface

K = −1.06201e+001 A4 = 1.37361e−004 A6 = 3.10899e−007
A8 = 3.75177e−009 A10 = −6.14276e−011 A12 = −6.89459e−011

21st surface

K = 6.49081e+005 A4 = −4.03975e−005 A6 = 2.52915e−005
A8 = −1.04384e−006 A10 = −1.60646e−007

22nd surface

K = −3.97997e−001 A4 = 1.04662e−004 A6 = 1.91884e−005
A8 = −1.34853e−006 A10 = 5.06561e−007 A12 = −8.45556e−008

Various Data
Zoom Ratio 29.49

|  | Wide Angle | Intermediate | Telephoto |
|---|---|---|---|
| Focal Length | 2.55 | 21.11 | 75.18 |
| F-number | 1.85 | 3.07 | 3.50 |
| Half Angle of View (degrees) | 36.88 | 6.09 | 1.71 |
| Image Height | 1.91 | 2.25 | 2.25 |
| Overall Lens Length | 72.84 | 72.84 | 72.84 |
| BF | 4.23 | 4.23 | 4.23 |
| d5 | 0.30 | 18.76 | 25.25 |
| d13 | 25.22 | 6.75 | 0.26 |
| d14 | 6.85 | 0.95 | 0.27 |
| d20 | 0.97 | 6.51 | 6.57 |
| d22 | 7.05 | 7.41 | 8.03 |

Zoom Lens Unit Data

| Unit No. | Front Surface | Focal Length |
|---|---|---|
| 1 | 1 | 36.32 |
| 2 | 6 | −5.11 |
| 3 | 14 | ∞ |
| 4 | 15 | 10.78 |
| 5 | 21 | −11.91 |
| 6 | 23 | 10.87 |
| 7 | 26 | ∞ |

THIRD NUMERICAL EXAMPLE

Unit mm

Surface Data

| Surface No. | r | d | nd | νd |
|---|---|---|---|---|
| 1 | 55.991 | 1.20 | 1.85478 | 24.8 |
| 2 | 23.239 | 4.00 | 1.63854 | 55.4 |
| 3 | 1347.216 | 0.15 | | |
| 4 | 28.018 | 2.50 | 1.80400 | 46.6 |
| 5 | 128.365 | (variable) | | |
| 6 | 4563.454 | 0.80 | 1.88300 | 40.8 |
| 7 | 6.330 | 1.90 | | |
| 8 | 118.048 | 0.60 | 1.83481 | 42.7 |
| 9 | 11.659 | 1.20 | | |
| 10 | −18.905 | 0.60 | 1.80400 | 46.6 |
| 11 | 134.353 | 0.30 | | |
| 12 | 16.494 | 2.00 | 1.95906 | 17.5 |
| 13 | −316.248 | (variable) | | |
| 14(stop) | ∞ | (variable) | | |
| 15* | 9.901 | 2.80 | 1.55332 | 71.7 |
| 16* | −21.070 | 2.60 | | |
| 17 | 13.882 | 0.60 | 2.00069 | 25.5 |

-continued

Unit mm

| | | | | |
|---|---|---|---|---|
| 18 | 7.609 | 0.50 | | |
| 19 | 9.354 | 2.50 | 1.49700 | 81.5 |
| 20 | −11.963 | (variable) | | |
| 21* | −2325.097 | 0.60 | 1.55332 | 71.7 |
| 22* | 6.609 | (variable) | | |
| 23 | 7.977 | 2.73 | 1.59522 | 67.7 |
| 24 | −10.769 | 0.65 | 1.84666 | 23.8 |
| 25 | −17.795 | 0.50 | | |
| 26 | ∞ | 1.78 | 1.54400 | 60.0 |
| 27 | ∞ | 1.35 | | |
| image plane | ∞ | | | |

Aspherical Surface Data

15th surface

K = −3.15922e−001 A4 = −9.19978e−005 A6 = 3.60900e−007
A8 = 6.56282e−009 A10 = 4.26809e−010 A12 = −7.62147e−011

16th surface

K = −9.79463e+000 A4 = 1.37361e−004 A6 = 3.10899e−007
A8 = 3.75177e−009 A10 = −4.85642e−010 A12 = −6.89459e−011

21st surface

K = 6.49081e+005 A4 = −6.20723e−005 A6 = 2.40292e−005
A8 = −8.53404e−007 A10 = −1.57777e−007

22nd surface

K = −3.97997e−001 A4 = 1.04662e−004 A6 = 1.91884e−005
A8 = −1.34853e−006 A10 = 5.06561e−007 A12 = −8.45556e−008

Various Data
Zoom Ratio 24.92

| | Wide Angle | Intermediate | Telephoto |
|---|---|---|---|
| Focal Length | 2.60 | 20.51 | 64.79 |
| F-number | 1.85 | 3.07 | 3.50 |
| Half Angle of View (degrees) | 36.33 | 6.26 | 1.99 |
| Image Height | 1.91 | 2.25 | 2.25 |
| Overall Lens Length | 70.88 | 70.88 | 70.88 |
| BF | 3.00 | 3.00 | 3.00 |
| d5 | 0.56 | 18.45 | 24.74 |
| d13 | 24.74 | 6.85 | 0.57 |
| d14 | 6.57 | 0.95 | 0.99 |
| d20 | 0.97 | 5.25 | 5.07 |
| d22 | 6.81 | 8.15 | 8.29 |

Zoom Lens Unit Data

| Unit No. | Front Surface | Focal Length |
|---|---|---|
| 1 | 1 | 36.05 |
| 2 | 6 | −5.19 |
| 3 | 14 | ∞ |
| 4 | 15 | 10.21 |
| 5 | 21 | −11.91 |
| 6 | 23 | 10.54 |
| 7 | 26 | ∞ |

FOURTH NUMERICAL EXAMPLE

Unit mm

Surface Data

| Surface No. | r | d | nd | vd |
|---|---|---|---|---|
| 1 | 53.202 | 1.20 | 1.85478 | 24.8 |
| 2 | 22.380 | 4.50 | 1.63854 | 55.4 |
| 3 | 408.497 | 0.15 | | |
| 4 | 27.806 | 2.50 | 1.80400 | 46.6 |
| 5 | 131.602 | (variable) | | |
| 6 | 116.924 | 0.80 | 1.88300 | 40.8 |
| 7 | 5.926 | 1.90 | | |
| 8 | 118.048 | 0.60 | 1.83481 | 42.7 |
| 9 | 12.128 | 1.20 | | |
| 10 | −17.591 | 0.60 | 1.80400 | 46.6 |
| 11 | 49.248 | 0.30 | | |
| 12 | 16.494 | 2.00 | 1.95906 | 17.5 |
| 13 | −166.768 | (variable) | | |
| 14(stop) | ∞ | (variable) | | |
| 15* | 9.961 | 2.80 | 1.55332 | 71.7 |
| 16* | −23.259 | 2.60 | | |
| 17 | 15.053 | 0.60 | 2.00100 | 29.1 |
| 18 | 7.609 | 0.50 | | |
| 19 | 8.721 | 2.50 | 1.49700 | 81.5 |
| 20 | −11.963 | (variable) | | |
| 21* | −2331.827 | 0.60 | 1.55332 | 71.7 |
| 22* | 6.609 | (variable) | | |
| 23 | 7.416 | 2.73 | 1.59522 | 67.7 |
| 24 | −8.243 | 0.65 | 1.84666 | 23.8 |
| 25 | −17.795 | 1.00 | | |
| 26 | ∞ | 1.78 | 1.54400 | 60.0 |
| 27 | ∞ | 1.75 | | |
| image plane | ∞ | | | |

Aspherical Surface Data

15th surface

K = −3.19035e−001 A4 = −9.33622e−005 A6 = 4.00122e−007
A8 = 4.62197e−009 A10 = 7.92491e−010 A12 = −1.02473e−010

16th surface

K = −1.08600e+001 A4 = 1.37361e−004 A6 = 3.10899e−007
A8 = 3.75177e−009 A10 = −7.95334e−010 A12 = −6.89459e−011

21st surface

K = 6.49081e+005 A4 = −7.14004e−005 A6 = 3.01942e−005
A8 = −8.79423e−007 A10 = −1.77019e−007

22nd data

K = −3.97997e−001 A4 = 1.04662e−004 A6 = 1.91884e−005
A8 = −1.34853e−006 A10 = 5.06561e−007 A12 = −8.45556e−008

Various Data
Zoom Ratio 24.88

| | Wide Angle | Intermediate | Telephoto |
|---|---|---|---|
| Focal Length | 2.40 | 17.91 | 59.71 |
| F-number | 1.85 | 3.07 | 3.50 |
| Half Angle of View (degrees) | 38.55 | 7.16 | 2.16 |
| Image Height | 1.91 | 2.25 | 2.25 |
| Overall Lens Length | 72.60 | 72.60 | 72.60 |
| BF | 3.91 | 3.91 | 3.91 |
| d5 | 0.27 | 18.28 | 24.60 |
| d13 | 24.97 | 6.96 | 0.64 |
| d14 | 6.63 | 1.48 | 0.80 |
| d20 | 0.97 | 6.25 | 8.72 |
| d22 | 7.13 | 6.99 | 5.20 |

Zoom Lens Unit Data

| Unit No. | Front Surface | Focal Length |
|---|---|---|
| 1 | 1 | 36.48 |
| 2 | 6 | −4.83 |
| 3 | 14 | ∞ |
| 4 | 15 | 10.55 |
| 5 | 21 | −11.91 |
| 6 | 23 | 10.63 |
| 7 | 26 | ∞ |

FIFTH NUMERICAL EXAMPLE

Unit mm

Surface Data

| Surface No. | r | d | nd | νd |
|---|---|---|---|---|
| 1 | 54.157 | 1.50 | 1.84666 | 23.9 |
| 2 | 33.403 | 5.43 | 1.48749 | 70.2 |
| 3 | 810.417 | 0.20 | | |
| 4 | 35.032 | 3.35 | 1.60311 | 60.6 |
| 5 | 181.969 | (variable) | | |
| 6 | −435.202 | 0.49 | 1.88300 | 40.8 |
| 7 | 8.122 | 3.20 | | |
| 8 | −22.785 | 0.80 | 1.69680 | 55.5 |
| 9 | 26.186 | 0.26 | | |
| 10 | 16.247 | 2.00 | 1.92286 | 18.9 |
| 11 | 64.624 | (variable) | | |
| 12(stop) | ∞ | (variable) | | |
| 13* | 13.293 | 3.00 | 1.58313 | 59.4 |
| 14* | −25.604 | 4.33 | | |
| 15 | 26.018 | 0.50 | 1.84666 | 23.9 |
| 16 | 8.703 | 0.76 | | |
| 17 | 10.465 | 3.27 | 1.71300 | 53.9 |
| 18 | −20.104 | (variable) | | |
| 19* | −31.746 | 0.50 | 1.58313 | 59.4 |
| 20* | 7.996 | (variable) | | |
| 21 | 11.605 | 0.50 | 1.84666 | 23.9 |
| 22 | 7.213 | 3.66 | 1.69680 | 55.5 |
| 23 | −26.484 | 2.50 | | |
| 24 | ∞ | 2.38 | 1.54400 | 60.0 |
| 25 | ∞ | 1.73 | | |
| image plane | ∞ | | | |

Aspherical Surface Data

13th surface $K = -2.94588e+000$ $A4 = 1.17484e-004$ $A6 = 6.71350e-008$
$A8 = 1.46270e-008$ $A10 = 2.63374e-011$ $A12 = -9.12649e-013$ 14th surface $K = 3.54980e+000$ $A4 = 1.55804e-004$ $A6 = 3.98572e-007$
$A8 = 1.97233e-008$ $A10 = -2.51494e-010$ $A12 = 1.11981e-012$ 19th surface $K = -5.40403e+001$ $A4 = 3.06317e-005$ $A6 = -8.47953e-007$
$A8 = -1.67404e-007$ $A10 = -1.40973e-009$ $A12 = 1.73863e-010$ 20th surface $K = -6.28974e-001$ $A4 = 3.39396e-004$ $A6 = -3.81974e-006$
$A8 = -2.47412e-007$ $A10 = 4.00993e-010$ $A12 = 1.70105e-010$

Various Data
Zoom Ratio 10.00

| | Wide Angle | Intermediate | Telephoto |
|---|---|---|---|
| Focal Length | 3.80 | 17.83 | 38.04 |
| F-number | 1.85 | 2.69 | 3.00 |
| Half Angle of View (degrees) | 33.83 | 9.55 | 4.51 |
| Image Height | 2.55 | 3.00 | 3.00 |
| Overall Lens Length | 86.94 | 86.94 | 86.94 |
| BF | 5.78 | 5.78 | 5.78 |
| d5 | 0.85 | 21.07 | 30.63 |
| d11 | 31.46 | 11.24 | 1.68 |
| d12 | 7.49 | 0.85 | 2.68 |
| d18 | 0.97 | 4.68 | 7.81 |
| d20 | 6.63 | 9.56 | 4.61 |

Zoom Lens Unit Data

| Unit No. | Front Surface | Focal Length |
|---|---|---|
| 1 | 1 | 55.44 |
| 2 | 6 | −7.75 |
| 3 | 12 | ∞ |
| 4 | 13 | 12.07 |
| 5 | 19 | −10.90 |
| 6 | 21 | 13.26 |
| 7 | 24 | ∞ |

TABLE 1

| Conditional Expression | | First Numerical Example | Second Numerical Example | Third Numerical Example | Fourth Numerical Example | Fifth Numerical Example |
|---|---|---|---|---|---|---|
| | fw | 2.60 | 2.55 | 2.60 | 2.40 | 3.81 |
| | ft | 76.82 | 75.18 | 64.79 | 59.71 | 38.05 |
| | f2 | −5.05 | −5.11 | −5.19 | −4.83 | −7.75 |
| | f3 | 10.67 | 10.78 | 10.21 | 10.55 | 12.07 |
| | f4 | −11.91 | −11.91 | −11.91 | −11.91 | −10.90 |
| | β2w | −0.19 | −0.18 | −0.19 | −0.17 | −0.18 |
| | β3w | −0.30 | −0.30 | −0.29 | −0.30 | −0.26 |
| | β2t | −2.02 | −1.92 | −1.83 | −1.38 | −0.63 |
| | β3t | −0.79 | −0.83 | −0.71 | −1.01 | −0.81 |
| (1) | (β2t/β2w)/(β3t/β3w) | 4.16 | 3.77 | 3.82 | 2.40 | 1.11 |
| (2) | f2/fw | −1.94 | −2.00 | −2.00 | −2.01 | −2.04 |
| (3) | f3/fw | 4.10 | 4.23 | 3.93 | 4.40 | 3.17 |
| (4) | νp3 | 71.7/81.5 | 71.7/94.9 | 71.7/81.5 | 71.7/81.5 | 71.7/81.5 |
| (5) | νn3 | 29.1 | 29.1 | 25.46 | 29.1 | 25.46 |
| (6) | Nn3 | 2.0010 | 2.0010 | 2.0007 | 2.0010 | 2.0007 |
| (7) | f4/ft | −0.16 | −0.16 | −0.18 | −0.20 | −0.29 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-063356, filed Mar. 21, 2012, which is hereby incorporated by reference herein in its entirety.

What is claimed is:

1. A zoom lens comprising, from an object side to an image side:
a first lens unit having a positive refractive power;
a second lens unit having a negative refractive power;
an aperture stop;
a third lens unit having a positive refractive power;
a fourth lens unit having a negative refractive power; and
a fifth lens unit having a positive refractive power,
wherein, during zooming, the first lens unit and the aperture stop do not move, and the second, third, and fourth lens units move along different loci, and
wherein the zoom lens satisfies a conditional expression $$0.8<(\beta 2t/\beta 2w)/(\beta 3t/\beta 3w)<5.0,$$

where $\beta 2w$ and $\beta 2t$ are respectively lateral magnifications of the second lens unit at a wide angle end and at a telephoto end, and $\beta 3w$ and $\beta 3t$ are respectively lateral magnifications of the third lens unit at the wide angle end and at the telephoto end.

2. The zoom lens according to claim 1,
wherein the zoom lens satisfies a conditional expression $$-2.5<f2/fw<-1.5,$$

where f2 is a focal length of the second lens unit, and fw is a focal length of the entire zoom lens at the wide angle end.

3. The zoom lens according to claim 1,
wherein the zoom lens satisfies a conditional expression $$2.5<f3/fw<5.5,$$

where f3 is a focal length of the third lens unit, and fw is a focal length of the entire zoom lens at the wide angle end.

4. The zoom lens according to claim 1,
wherein the zoom lens satisfies a conditional expression $$65.0<vp3,$$

where vp3 is an Abbe number of a material of at least one positive lens included in the third lens unit.

5. The zoom lens according to claim 1,
wherein the zoom lens satisfies conditional expressions $$vn3<35.0 \text{ and}$$

$$1.8<Nn3,$$

where vn3 and Nn3 are respectively an Abbe number and a refractive index of a material of at least one negative lens included in the third lens unit.

6. The zoom lens according to claim 1,
wherein the fourth lens unit includes a single lens that moves during focusing, and
wherein the zoom lens satisfies a conditional expression $$-0.4<f4/ft<-0.1,$$

where f4 is a focal length of the fourth lens unit, and ft is a focal length of the entire zoom lens at the telephoto end.

7. An image pickup apparatus comprising:
the zoom lens according to claim 1; and
an image pickup device that captures an image formed by the zoom lens.

* * * * *